United States Patent
Closson

(10) Patent No.: US 11,278,819 B2
(45) Date of Patent: Mar. 22, 2022

(54) SEASON-BASED, HEAD-TO-HEAD, FANTASY SPORTS SYSTEMS AND METHODS

(71) Applicant: Morgan Closson, San Francisco, CA (US)

(72) Inventor: Morgan Closson, San Francisco, CA (US)

(*) Notice: Subject to any disclaimer, the term of this patent is extended or adjusted under 35 U.S.C. 154(b) by 275 days.

(21) Appl. No.: 16/116,919

(22) Filed: Aug. 30, 2018

(65) Prior Publication Data

US 2020/0070058 A1 Mar. 5, 2020

(51) Int. Cl.
| | | |
|---|---|---|
| A63F 9/24 | (2006.01) | |
| A63F 13/00 | (2014.01) | |
| G07F 17/00 | (2006.01) | |
| A63F 13/828 | (2014.01) | |
| A63F 13/798 | (2014.01) | |
| A63F 13/46 | (2014.01) | |

(52) U.S. Cl.
CPC ............ *A63F 13/828* (2014.09); *A63F 13/46* (2014.09); *A63F 13/798* (2014.09)

(58) Field of Classification Search
CPC .................................................. A63F 13/828
See application file for complete search history.

(56) References Cited

U.S. PATENT DOCUMENTS

2006/0252476 A1* 11/2006 Bahou ..................... A63F 13/12
463/4

OTHER PUBLICATIONS

Ask Yahoo! Sports Fantasy Football PLUS Help: Playing Season, May 16, 2007, <https://web.archive.org/web/20070516212743/http://help.yahoo.com/l/us/yahoo/footballplus/rules/rules-02.html>, retrieved Aug. 31, 2020 (Year: 2007).*
Ask Yahoo! Sports Fantasy Football PLUS Help: Playoffs, May 16, 2007, <https://web.archive.org/web/20070516212749/http://help.yahoo.com/l/us/yahoo/footballplus/rules/rules-22.html>, retrieved Aug. 31, 2020 (Year: 2007).*
Ask Yahoo! Sports Fantasy Football PLUS Help: Scoring, May 16, 2007, <https://web.archive.org/web/20070516212908/http://help.yahoo.com/l/us/yahoo/footballplus/rules/rules-08.html>, retrieved Jul. 2, 2021 (Year: 2007) (Year: 2021).*

* cited by examiner

*Primary Examiner* — Milap Shah
*Assistant Examiner* — Jason Pinheiro
(74) *Attorney, Agent, or Firm* — Total Awareness Consulting Services; Robert Winslow

(57) ABSTRACT

A fantasy sports service that emulates lineups, schedules and scoring in the actual sport on which the fantasy sport is based. Users participate in a season-based, head-to-head fantasy sports league by means of its lineup, scheduling and scoring services. Users draft active rosters of fantasy players, select starting lineups from that roster for fantasy games and acquire players during the season thru free agency or trades that emulate an actual sport. Users compete in a fantasy regular season and postseason schedule of games that emulate an actual season in the number and format of games. Users compete in fantasy games with scores that approximate actual games scores using statistics that are predictive of success in an actual sport. Fantasy game scoring also accommodates circumstances where player statistics are unavailable.

3 Claims, 11 Drawing Sheets

SEASON-BASED, HEAD-TO-HEAD, FANTASY SPORTS SYSTEMS AND METHODS

FIELD OF THE DISCLOSURE

The disclosure relates to fantasy sports, and more specifically to head-to-head fantasy sports that emulate realistic lineups, schedules and scoring.

BACKGROUND

Head-to-head fantasy sports are the most prevalent type of fantasy sports played on a weekly schedule. Participants draft fantasy teams to play in a fantasy league, usually just prior to the start of an actual season in a given sport. Participants select fantasy starting lineups for each week's fantasy game from their drafted teams. However, fantasy starting lineups are often not representative of actual on-field or on-court lineups. For example, fantasy baseball lineups typically have twenty-five players, twenty-two 'active' players and three 'bench' players. The active players include seven infielders, five outfielders, one utility player or designated hitter, and nine pitchers of any designation. This is not an accurate representation of an actual, on-field baseball lineup. Major League Baseball starting lineups have five infielders, three outfielders, a designated hitter (in the American League) and one of five starting pitchers who pitch in rotation and who is relieved by relief pitchers, including a closer. As another example, the fantasy basketball lineups widely in use today include ten active players. However, a very common practice in the National Basketball Association is to play nine players in a given game using a nine-man rotation, rotating players in and out of the five court positions, with not more than two centers in the lineup. Participants are therefore unable to manage a team of players as an actual coach or team manager would.

Fantasy teams play against each other in a rotating, weekly game schedule with one game per week for each team—one team versus another team, one-to-one or head-to-head—during twenty-five weeks of the given sport's regular season. The first twenty-two weeks serve as a fantasy league's 'regular' season. The last three weeks serve as a fantasy league's 'playoffs'. Each week is worth one win. A participant may draft a strong team that does well in a fantasy league's 'regular' season. That participant's team may outscore eighteen weekly opponents and be outscored the other four weeks, ending the regular season with a record of, e.g., 18 wins and 4 losses and earning a spot in the fantasy league's 'playoffs'. The overall season winner is the team that does not lose in the playoffs.

This twenty-five-week fantasy season with one game per week for each team does not represent an actual season. Major League Baseball teams, for example, have one hundred and sixty-two regular season games where each team plays another team in two-, three-, four- or five-game series in succession and then moves on to another series with another opponent. The postseason consists of three rounds of playoff series: four divisional playoff, best-of-five series between the top eight teams in the league, two league playoff, best-of-seven series between the divisional winners, and a championship, best-of-seven series between the league winners.

As another example, the National Basketball Association's regular season schedule consists of eighty-two games where each plays another team in a single game and moves on to another game with another opponent. The postseason consists of four rounds of playoff series: eight conference quarterfinal, best-of-seven series between the top sixteen teams in the league, four conference semifinal, best-of-seven series between the quarterfinal winners, two conference final series between the semifinal winners, and a championship, best-of-seven series between the final winners. Participants miss out on a compelling fantasy sports season that mirrors the regular and postseason schedules of the sports on which their fantasy sport is based.

Finally, head-to-head fantasy sports scoring fails to represent the actual scoring on the field or on court. Scoring in the fantasy league's one-game-per-week schedule is based on weekly statistics from the actual sport. Three variants exist for how scoring is computed, and winners are determined, in a particular head-to-head fantasy sports league: a most-categories-is-a-win league (a 'most-categories league'); each-category-is worth-a-win league (an 'each-category league'); and a head-to-head points league (a 'points league'). These three variants depend upon preestablished settings in a participant's league and are widely available. In a most-categories league, a team may win the most statistical categories, such as batting average, home runs and stolen bases, and receive one win for a record of, e.g., 1-0. In an each-category league with, e.g., ten statistical categories, team results are tabulated in each category. A team whose active lineup may win five categories, lose four categories and tie one would earn a record of, e.g., 5-4-1. In category leagues, ten categories are common in head-to-head fantasy baseball, and eight or nine categories in head-to-head fantasy basketball. The teams with the highest winning percentage at the end of the fantasy season enter into a playoff. The overall season winner is the team that does not lose in the playoffs.

In a points league, point values are established for specific statistics and a total score is accumulated by each team, per week. E.g., a home run (HR) could be assigned four fantasy points and a runs-batted-in (RBI) could be assigned one fantasy point, and so on. The winner is determined solely by which team accumulates the most fantasy points versus a single opponent. The resulting team record might be, e.g., a win (1-0-0), loss (0-1-0) or tie (0-0-1). Using head-to-head points, scores conclude in the hundreds each week. For example, a single game's score might be 596 points for one team and 385 points for its opponent. Major League Baseball game scores are much lower. Final game scores of 10 to 7 or 6 to 5 are more representative of an actual game. A representative, National Basketball Association team's final game score is 105.

These scoring systems are rudimentary and do not reflect an understanding of how games are won. For example, games are not won or lost by players' performances during a week. Games are won or lost by players' performances on game day. As another example, ten common statistics used in head-to-head fantasy baseball scoring systems include five batting statistics (Runs Scored (R), Home Runs (HR), Runs Batted In (RBI), Stolen Bases (SB) and Batting Average (AVG)) and five pitching statistics (Wins (W), Saves (SV), Strikeouts (K), Earned Run Average (ERA) and Walks Plus Hits Per Innings Pitched (WHIP)). Scoring systems based on such rudimentary statistics oversimplify a complex game. Stolen bases, for example, are widely known to have little impact on winning in Major League Baseball, yet they are one of five batting statistics widely in use to determine offensive success in head-to-head fantasy baseball. The complexity of the game of baseball is an element appreciated by Major League Baseball fans, but which is lost in most scoring systems.

As another example, six common statistics used in head-to-head fantasy basketball scoring systems are: points, rebounds, assists, steals, blocks and turnovers. These scoring systems are also based on rudimentary statistics that oversimplify a complex game. For example, shooting percentages and two-, three-pointers-made are key elements of the game for which there is no accounting in these scoring systems.

While head-to-head fantasy sports produce a competition of sorts and while it is true that the competition is based on weekly compilations of game day statistics of actual players, current head-to-head fantasy sports are missing the point of having a fictitious, yet realistically compelling, version of the actual sport. A game score of 596-385 is not a representative of a baseball, basketball, football, hockey, soccer, rugby or any other game. And a regular season record of 18-4 is not representative of any of these sports.

What is needed therefore are season-based, head-to-head fantasy sports systems and methods that emulate realistic lineups, schedules and scoring.

SUMMARY

Technology is disclosed for a fantasy sports service that emulates lineups, schedules and scoring in the actual sport on which the fantasy sport is based (the "technology"). The technology enables users to participate in a season-based, head-to-head fantasy sports league by means of its lineup, scheduling and scoring services. Lineup service includes active roster, starting lineup and player acquisition services. Lineup service enables users to draft an active roster of fantasy players, select starting lineups from that roster for fantasy games and to acquire players during the season thru free agency or trades that emulate an actual sport. Scheduling service includes regular season and postseason services. Scheduling service enable users to compete in a fantasy regular season and postseason schedule of games that emulate an actual sport. Scoring service includes player statistics and game scoring services. Scoring service enables users to compete in fantasy games with scores that approximate actual games scores using statistics that are predictive of success in an actual sport.

BRIEF DESCRIPTION OF THE DRAWINGS

The drawings described herein are for illustrative purposes only of selected embodiments and not all possible implementations and are not intended to limit the scope of the present disclosure.

DEFINITIONS

Figure 1:
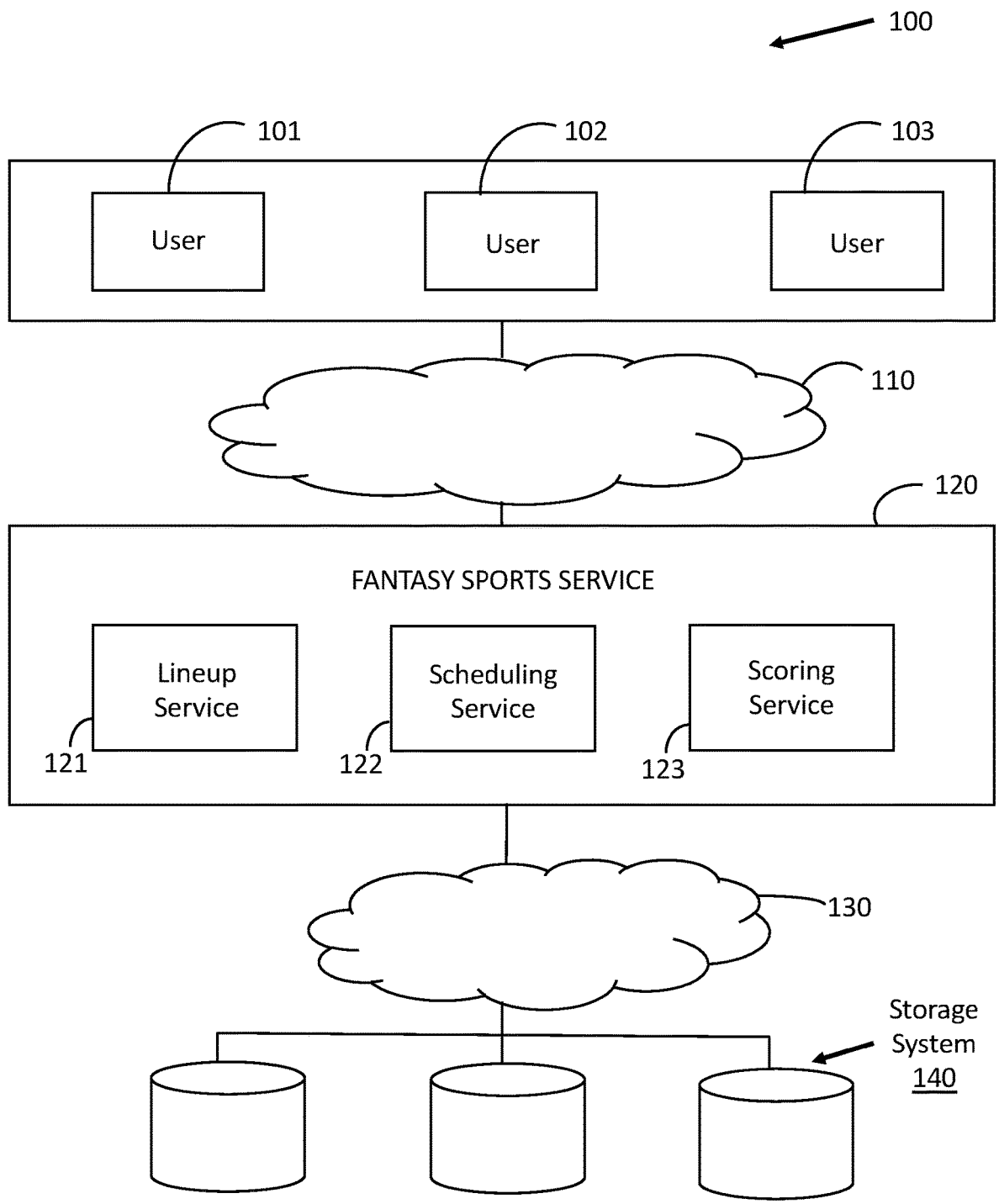
FIG. 1 is a block diagram illustrating an environment in which the technology may operate in various embodiments.

Active Roster: is a group of players on an actual or fantasy sports team who may be selected to play in a game.

Batting Order: an order in which players on an actual or fantasy baseball team's starting lineup take their turn at bat.

Batter: a player on an actual or fantasy baseball team's starting lineup who is designated to take turns at bat.

Draft: a process, familiar to those persons of ordinary skill in the art, where users select players for their fantasy teams' active rosters from actual players in the sport on which the fantasy sport is based.

Fantasy Sport: a sport where participants draft players for their fantasy teams from actual players in the sport on which a fantasy sport is based. Participants compete in fantasy games that are scored based on the actual players' performances in preselected player statistics.

Actual Game Day: a day where at least one actual game might be played during the regular season of the sport on which the fantasy sport is based.

Fantasy Game Day: a day of the week where a fantasy game may be scheduled during the regular season of the actual sport on which the fantasy sport is based.

Necessary Game Day(s): the actual game day(s) which are necessary to ensure that statistics for most players, in the sport on which the fantasy sport is based, will be available to score fantasy games on a given day.

Game Format: a format, such as single-game, three-game series or rounds of multi-game series, in which games are played during an actual or fantasy sport's season.

Player Acquisition: a process, familiar to those persons of ordinary skill in the art, where users select players for their fantasy teams' active rosters, during the course of a fantasy season, from actual players in the sport on which the fantasy sport is based. Players may be acquired as free agents or through trades between users. Free agents are those players who are not currently on any fantasy team's rosters.

Acquired Player: a player on a fantasy team's active roster that was acquired during the course of the fantasy season.

Active Roster Player: a player on an actual or fantasy sport team's active roster.

Position Player: a player on an actual or fantasy sport team's active roster who is designated to play a specific position in that sport.

Starting Lineup Player: a player on an actual or fantasy sport team's starting lineup for an actual or fantasy game, respectively.

Player Statistic: a statistic corresponding to the performance of a player on an actual sports team during a game.

Point: a numerical value associated with a player statistic in fantasy sports.

Rotation: an actual or fantasy sport team's plan or scheme for replacing players in its starting lineup with other players during the course of a game or a succession of games. For example, actual or fantasy baseball teams plan pitching rotations for the starting pitchers on their active roster. Five starting pitchers, e.g., pitch in a rotating sequence in a succession of games, games one thru five. As another example, actual or fantasy basketball teams plan rotations of rotation players during a single game.

Rotation Sequence: an actual or fantasy baseball team's starting pitcher's sequence in a pitching rotation. For example, starting pitcher, John Smith, may have a rotation sequence of five, meaning that John Smith will pitch in the fifth game in a succession of games.

Game Rotation Sequence: an actual or fantasy baseball game's sequence in a pitching rotation. For example, the tenth thru fifteenth games in a baseball season may be designated as games one thru five in a rotation, meaning that the fifteenth game of the season has a game rotation sequence of five.

Spot Starter: a player on an actual or fantasy sport team's active roster who may be designated to back up another player on that team's active roster who is unavailable to play in a game, and therefore has no associated player statistics for that game, due to injury or some other reason.

Starting Pitcher: a pitcher on an actual or fantasy baseball team's starting lineup who is designated to play (start) in a game when that game begins.

Starting Lineup: a group of players on an actual or fantasy sport team's active roster who are designated to play (start) in a game when that game begins. Players on a starting lineup may have assigned attributes. E.g., players on an actual or fantasy baseball team may be designated as batters with an associated batting order.

Weighted Point Value: a numerical value associated with each selected player statistic in a fantasy sport.

DETAILED DESCRIPTION

Environment for Fantasy Sports Service

Technology is disclosed for a fantasy sports service that provides for team lineups, and fantasy game scheduling and scoring (the "technology"). Several embodiments of the technology are described in more detail in reference to the figures. Turning to FIG. 1, FIG. 1 is a block diagram illustrating an environment 100 in which the technology may operate in various embodiments. The environment 100 includes a fantasy sports service 120 that provides a set of services, including services such as a lineup service 121, a scheduling service 122 and a scoring service 123 to a set of users, e.g., user 101, user 102 and user 103. The set of users may access the fantasy sports service 120 via a communication network 110 using a variety of devices, including a desktop, a laptop, a tablet PC, or a smart phone.

In various embodiments, fantasy sports service 120 provides for the participation in fantasy sports league for a set of users, such as users 101, 102 and 103. The lineup service 121 allows users to draft an active roster of players for their respective teams, select starting lineups from that roster for fantasy games, and to acquire players during the season thru free agency or trades. Scheduling service 122 provides users with a realistic schedule of regular and postseason games in which they will compete. The scoring service 123 provides users with fantasy game scores that approximate actual games scores and that are based on single-game statistics which are predictive of winning, consistent with various embodiments. Further details regarding lineups, scheduling and scoring are described with reference to at least FIGS. 2-11.

Fantasy sports service 120 may be implemented in a variety of configurations. One typical configuration may include an online configuration in which fantasy sports service 120 is implemented in a distributed network, for example, LAN, WAN or Internet. Users access fantasy sports service 120 over a communication network such as network 110. In various embodiments, fantasy sports service 120 may also be implemented in a client-server configuration in which an application corresponding to the client portion may be installed on the device of the user. Users may access fantasy sports service 120 using a web browser or a fantasy sports service application installed on the device of the user.

Fantasy Sports Service

Figure 2:
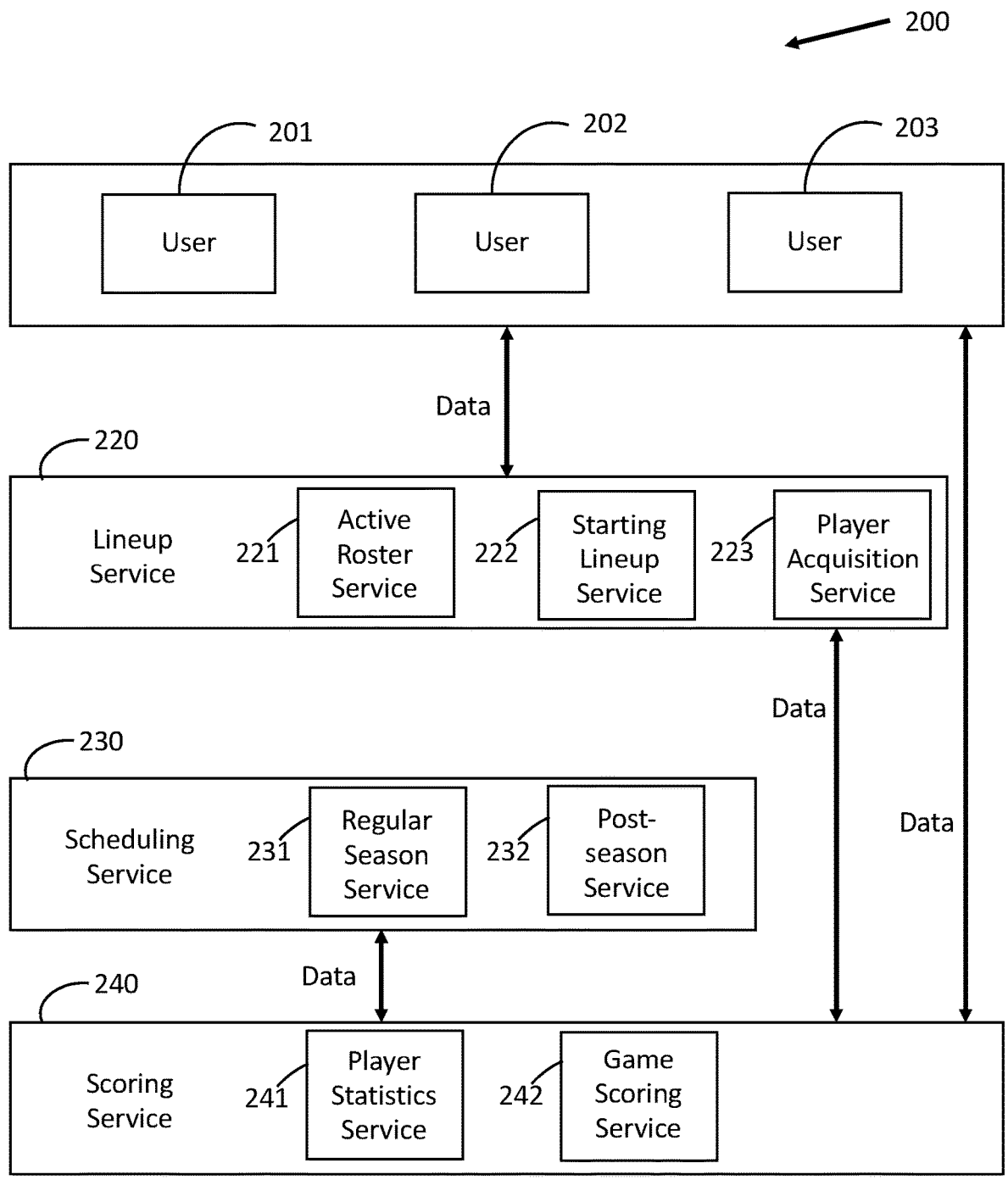
FIG. 2 is a block diagram illustrating an environment for providing a lineup service, a scheduling service and a scoring service, consistent with various embodiments.

Turning now to FIG. 2, FIG. 2 is a block diagram, consistent with various embodiments, illustrating an environment 200 for the fantasy sports service of FIG. 1. Lineup service 220 of environment 200 may be similar to lineup service 121 of FIG. 1. Scheduling service 230 of environment 200 may be similar to scheduling service 122 of FIG. 1. Scoring service 240 of environment 200 may be similar to scoring service 123 of FIG. 1. Users 201, 202 and 203 of environment 200 may be similar to users 101, 102 and 103 of FIG. 1.

Lineup Service

Lineup service 220, consistent with various embodiments, allows users, such as users 201, 202 and 203, to draft an active roster of fantasy players for their respective teams, select starting lineups from that roster for fantasy games, and to acquire players during the season thru free agency or trades.

Active roster service 221 allows users, such as users 201, 202 and 203, to establish an active roster of players for fantasy teams that reflects how an active roster of players are established for an actual team of the sport on which the fantasy sport is based, consistent with various embodiments. Instead of the fantasy lineups widely in use today, users select a roster of players that mirrors the roster in a given sport.

For example, consistent with various embodiments, the active roster for a head-to-head fantasy baseball team consists of twenty-five players, which exactly mirrors the rosters of Major League Baseball teams. The twenty-five players consist of five infielders, three outfielders, nine pitchers, one designated hitter and seven bench players. The infielders include a catcher, a first, second and a third baseperson, and a shortstop. The outfielders include a left, center and a right fielder. The nine pitchers include five starting pitchers, two relief pitchers, a closer and a spot starter. The seven bench players include any combination of position players.

The present invention's spot starter correlates to Major League Baseball's spot starter. In Major League Baseball, a spot starter is a pitcher on the active roster who is designated to back up a starting pitcher from time-to-time, due to injury or some other reason. In the present invention, the spot starter's statistics are used in a game when one of the five starting pitchers did not make their scheduled start or were not scheduled for enough starts to cover a particular week's games. In those instances, the spot starter's statistics are used.

In another example, consistent with various embodiments, the active roster for a head-to-head fantasy basketball team consists of thirteen players using a nine-man rotation, which mirrors commonly used active rosters in the National Basketball Association. The thirteen players consist of five starting players, four rotating players and four bench players. The five starting players correlate to the five court positions: point guard, shooting guard, small forward, power forward and center. The four rotating players are comprised of players in a combination of position players that includes no more than one rotating center. A maximum of two centers (starting and rotating) is typical of modern National Basketball Association lineups. The four bench players include any combination of position players.

Starting lineup service 222 allows users, such as users 201, 202 and 203, to select starting lineups from their active rosters for fantasy games that reflects how starting lineups are selected for actual games, consistent with various embodiments. Starting lineups may be selected for a single game or for multiple games over a fixed duration, such as a week, a day or a game. This duration, consistent with various embodiments, may be set by starting lineup service 222 or starting lineup service may allow users, such as users 201, 202 and 203, to set the duration.

For example, consistent with various embodiments, the starting lineup selection for a head-to-head fantasy baseball game consists of selecting, from an active roster, nine batters and five pitchers. The nine batters include five infielders, three outfielders and one designated hitter. The infielders include a catcher, a first, second and a third baseperson, and a shortstop. The outfielders include a left, center and a right fielder. Users select a corresponding batting order, one thru nine, for their batters. The batters and their associated batting order may be effective for a single game or for multiple games over a fixed duration, such as a week, a day or a game, consistent with various embodiments and a given fantasy league's rules. The five pitchers include a starting pitcher, two relief pitchers, a closer and a spot starter. The starting pitcher is one of five starting pitchers on an active roster who pitch in a pitching rotation in a user-designated sequence. The spot starter is used for scoring if necessary. Users select a corresponding rotation sequence, e.g., one thru five, for their starting pitchers. The rotation sequence corresponds to game rotation sequence, e.g., one thru five, for a succession of games. The starting pitchers and their corresponding rotation sequence may be effective for a single game or for multiple games over a fixed duration, such as a week, a day, a game or five games in succession, consistent with various embodiments and a given fantasy league's rules.

The present invention's starting pitchers and pitching rotations will revolutionize how head-to-head points fantasy baseball is played. Rather than an indiscriminate stable of nine pitchers, users select five starting pitchers and set a corresponding rotation sequence, one thru five, before the start of a given week's games, consistent with various embodiments. A particular fantasy game does not finish until the starting pitchers for each team, as determined by that team's fantasy pitching rotation, has taken the mound in that week's actual pitching rotation. The fantasy pitcher's rotation sequence does not need to take place on the same day as the actual pitcher's rotation sequence.

For example, a user may assign a starting pitcher a fantasy rotation sequence number of two, which corresponds to a fantasy game on a Tuesday, which has a fantasy game rotation sequence number of two. However, a Major League Baseball team manager may assign that starting pitcher an actual rotation sequence number of four, which corresponds to an actual game on the following Thursday, which has an actual game rotation sequence number of four. Once the starting pitcher has pitched in Thursday's actual game, his player statistics are allocated to the score of the previous Tuesday's fantasy game.

In this manner, scores for as many as five games could be open at any given time. Once both fantasy teams' starting pitchers have completed their actual starts and once the date of the given fantasy game has passed (thereby ensuring that the statistics are compiled for all of the position players selected for that game), the scoring for the fantasy game ends and its score is final.

Consistent with various embodiments, one of the starting pitchers may be designated as a two-start pitcher, which means that that pitcher will start in two games in a given week where six games are played. That week's statistics for the designated two-start pitcher are allocated to two games. For example, a pitcher may be given the first position in a rotation's sequence. This may result, e.g., in allocating that pitcher's statistics to game one and six. In the present invention, pitching rotations during the fantasy postseason comprise of four starting pitchers to mirror a common practice in Major League Baseball, consistent with various embodiments.

Users also select three relief pitchers from their active lineups that may be effective over a fixed duration, such as an entire week or a day, consistent with various embodiments and a given fantasy league's rules. Users may designate one of the relief pitchers as the closer. Similarly, users select a spot starter that may be effective over a fixed duration, such as an entire week or a day, consistent with various embodiments and a given fantasy league's rules. The spot starter acts as a sixth starter whose statistics are used in a game when one of the five starting pitchers (or four starters during the postseason) did not make their scheduled start or were not scheduled for enough starts to cover a particular week's games. In those instances, the spot starter's statistics are used.

In another example, consistent with various embodiments, the starting lineup selection for a head-to-head fantasy basketball game consists of selecting, from an active roster, five starting and four rotating players. The five starting players correlate to the five court positions: point guard, shooting guard, small forward, power forward and center. The four rotating players are comprised of players in a combination of position players that includes no more than one rotating center.

Season acquisition service 223, allows users, such as users 201, 202 and 203, to cut existing players on, and acquire new replacement players for, their active rosters during the course of the season that reflects how actual teams acquire new players for their active rosters, consistent with various embodiments. New players are acquired as free agents or thru trades with other users. Fantasy free agents are players who are not currently on any team's roster within a fantasy league. Users may also trade players on their active rosters for players on another user's roster. Players acquired as free agents or thru trades are not available to be selected for starting lineups for a fixed duration, such as a week, a day or a game. This duration, consistent with various embodiments, may be set by player acquisition service 223 or starting lineup service may allow users, such as users 201, 202 and 203, to set the duration. In some embodiments, players acquired as free agents or thru trades are not available to be selected for starting lineups until the Monday after their acquisition. For example, if a user acquires a player on Tuesday and adds that player to his or her active roster, that user cannot select the acquired player for a starting lineup until the following Monday.

Scheduling Service

Turning back to FIG. 2, scheduling service 230, consistent with various embodiments, provides users, such as users 201, 202 and 203, with a realistic fantasy season schedule, including both a fantasy regular and postseason schedule, in which users' fantasy teams will compete. Rather than an arbitrary twenty-five game schedule over twenty-five weeks, scheduling service 230 creates regular and postseason schedules that occur within an actual season's regular season schedule, and that emulate the total number of games and game format in the actual, regular and postseason schedules, of the sport on which the fantasy sport is based.

Scheduling service 230, consistent with various embodiments, determines which weekdays and total number of days during an actual season's regular season that fantasy games may be scheduled based on the necessary game days to score those fantasy games. Fantasy game days are days of the week, during the regular season of the sport on which the fantasy sport is based, on which fantasy games may be scheduled. Actual game days are days where at least one actual game might be played in the regular season of the sport on which the fantasy sport is based. Necessary game days are the actual game days necessary to ensure statistics for most players will be available to score fantasy games on a given day. Statistics for most players are necessary to score a fantasy game because players on each fantasy team's starting lineup may play for any actual team. It is important therefore to schedule fantasy games so that statistics will be available for most players.

A particular player's statistics may not be available for a player on a particular fantasy game's starting lineup. The points accumulated for that player in that game are equal to zero. This is consistent with scoring in current, head-to-head fantasy sports leagues. The present invention minimizes the occurrence of unavailable player statistics while increasing the number of fantasy games in a fantasy season to emulate the total number of actual games in an actual season.

For example, Major League Baseball's regular season typically occurs over one-hundred, eighty-seven-days with one-hundred, eighty-two actual game days and with five days, corresponding to the All-Star Break, where no games are played. This one-hundred, eighty-seven-day period covers approximately twenty-seven weeks. Every day of the week, excluding the All-Star Break, is an actual game day. In a typical week during its regular season, Major League Baseball teams play on six to seven days per week, Monday thru Sunday. As a result, statistics for most players are available to score fantasy games every day of the week.

Scheduling service 230 determines that one actual game day is necessary to provide statistics for most players to score the fantasy games on a given day. Scheduling service 230 determines that fantasy games may be scheduled seven days per week, Monday thru Sunday, during an actual Major League Baseball regular season. Fantasy game days are Monday, Tuesday, Wednesday, Thursday, Friday, Saturday and Sunday, excluding the All-Star Break. The total number of available fantasy games days is equal to one hundred, eighty-three.

In some embodiments, regular season service 231 schedules fantasy baseball games every game day of the week, Monday thru Sunday. Player statistics from Monday's games are used to score Monday's fantasy games; player statistics from Tuesday's games are used to score Tuesday's fantasy games, and so forth, consistent with various embodiments. In this example, Mondays are necessary game days to score fantasy games occurring on Mondays. Tuesdays are necessary game days to score fantasy games occurring on Tuesdays. Wednesdays are necessary game days to score fantasy games occurring on Wednesdays. Thursdays are necessary game days to score fantasy games occurring on Thursdays. Fridays are necessary game days to score fantasy games occurring on Fridays. Saturdays are necessary game days to score fantasy games occurring on Saturdays. Sundays are necessary game days to score fantasy games occurring on Sundays.

In another example, the National Basketball Association's regular season occurs over one-hundred, seventy-seven-days with one-hundred, sixty-nine actual game days and with eight days, corresponding to All-Star Week and Christmas Eve, where no games are played. This one-hundred, seventy-seven-day period covers approximately twenty-six weeks. Every day of the week, excluding All-Star Week and Christmas Eve, is an actual game day. In a typical week during its regular season, a National Basketball Association team plays three to four games. As a result, statistics for most players are available to score fantasy games every other day of the week. Scheduling service 230 determines that one to two actual game days are necessary to ensure statistics for most players will be available to score the fantasy games on a given day. Most National Basketball Association teams play a game every Friday, and at least one game over the course of every Monday and Tuesday, every Wednesday and Thursday, and every Saturday and Sunday. Scheduling service 230 determines that fantasy games may be scheduled four days per week, on Tuesdays, Thursdays, Fridays, and Sundays, during an actual National Basketball Association regular season. Fantasy game days are Tuesday, Thursday, Friday and Sunday, excluding All-Star Week and Christmas Eve. The total number of available fantasy game days is ninety-seven.

In some embodiments, regular season service 231 schedules fantasy basketball games on four days of the week: Tuesday, Thursday, Friday and Sunday. In this way, the availability of player statistics is maximized. Player statistics from Monday and Tuesday's games are used to score Tuesday's fantasy games; Wednesday and Thursday's games are used to score Thursday's fantasy games; Friday's game is used to score Friday's fantasy games; and player statistics from Saturday and Sunday's games are used to score Sunday's fantasy games, consistent with various embodiments. In this example, Mondays and Tuesdays are necessary game days to score fantasy games occurring on Tuesdays. Wednesdays and Thursdays are necessary game days to score fantasy games occurring on Thursdays. Fridays are necessary game days to score fantasy games occurring on Fridays. Saturday and Sunday are necessary game days to score fantasy games occurring on Sundays.

Regular season service 231, consistent with various environments, provides users, such as users 201, 202 and 203, with a fantasy regular season schedule in which users' fantasy teams will compete. The fantasy regular season schedule occurs within the time frame that an actual regular season of the sport on which the fantasy sport is based. Regular season service 231 uses the predetermined, fantasy game days to create a fantasy regular season schedule of games that emulates the total number of games that is being played in the actual regular season of the sport on which the fantasy sport is based.

For example, each Major League Baseball team plays one-hundred, sixty-two games during the regular season. Regular season service 231 creates a fantasy baseball, regular season schedule where each team plays one-hundred, sixty-two games on the first one-hundred sixty-two, available fantasy game days, consistent with various embodiments. In some embodiments, where fantasy baseball games are scheduled seven days a week, the one-hundred, sixty-two fantasy games are scheduled within the first twenty-four weeks of Major League Baseball's twenty-seven-week regular season, which takes the All-Star Break into account.

In another example, each National Basketball Association team plays eighty-two games during the regular season. Regular season service 231 creates a fantasy basketball, regular season schedule where each team plays eighty-two games on the first eighty-two, available fantasy game days, consistent with various embodiments. In some embodiments, where fantasy basketball games are scheduled four days a week, the eighty-two fantasy games are scheduled within the first twenty-two weeks of the National Basketball Association's twenty-six-week regular season, which takes the All-Star Week into account.

Regular season service 231, consistent with various environments, creates a fantasy regular season schedule of games that emulates the format of games that is being played in the actual regular season of the sport on which the fantasy sport is based. For example, Major League Baseball uses a series format during its regular season where teams play each other in a chronology of typically three- or four-game series in succession. When a series concludes, each team plays a different team in a subsequent series. Regular season service 231 creates a fantasy baseball, regular season schedule where each team plays another team in a chronology of three- or four-game series in succession, consistent with various embodiments. In another example, the National Basketball Association uses a single-game format during its regular season where teams play each other in single games in succession. When a game concludes, each team plays a different team in a subsequent game. Regular season service 231 creates a fantasy basketball, regular season schedule where each team plays others team in single games in succession, consistent with various embodiments.

Postseason service 232 provides users, such as users 201, 202 and 203, with a fantasy postseason schedule in which users' fantasy teams will compete, consistent with various environments. The fantasy postseason schedule occurs after the corresponding fantasy regular season schedule and within the time frame that an actual regular season of the sport on which the fantasy sport is based. Postseason service 232 first determines the number of fantasy teams and fantasy game days required to emulate the actual postseason of the sport on which the fantasy sport is based. Postseason service 232 determines the available, fantasy game days, which were not used for the fantasy regular season schedule, to create a fantasy postseason schedule. If the required number of fantasy teams and fantasy game days to emulate an actual season are not present, postseason service 232 determines what fantasy postseason format can be created that approximates an actual postseason based on the available fantasy teams and fantasy day games. Postseason service 232 creates a fantasy postseason schedule in a format that emulates or approximates the postseason of the sport on which the fantasy sport is based.

For example, Major League Baseball's postseason consists of three rounds of playoff series: a first round, divisional playoff series where eight teams with the best, divisional records compete; a second round, league playoff series where the four divisional winners compete; and a third round, championship playoff series between the two league winners. The first round is a best-of-five series. The second and third rounds are best-of-seven series. Postseason service 232, consistent with various embodiments, determines that eight fantasy teams and nineteen fantasy game days are required to emulate Major League Baseball's three-round postseason: five fantasy game days for the best-of-five series, and fourteen fantasy game days for the two best-of-seven series.

In some embodiments, one actual game day is necessary to score fantasy baseball games on a given day. Fantasy baseball games may be scheduled seven days per week, Monday thru Sunday. Fantasy game days are Mondays, Tuesdays, Wednesdays, Thursdays, Fridays, Saturdays and Sundays. The fantasy baseball regular season uses the fantasy game days in the first twenty-four weeks of Major League Baseball's twenty-seven-week regular season. The fantasy game days in the last three weeks of the regular season (weeks twenty-five thru twenty-seven) are available to be used for the fantasy postseason.

Postseason service 232, consistent with various embodiments, determines that there are twenty-one available, fantasy game days, which were not used for the fantasy regular season schedule, to create a fantasy postseason schedule. Postseason service 232 determines that, based on nineteen of the available, fantasy game days, a postseason format can be created that emulates an actual postseason. Postseason service 232 creates a fantasy postseason schedule with three rounds of playoff series: a first round, best-of-five, playoff series where eight teams with the best records compete; a second round, best-of-seven, playoff series where the four, first-round winners compete; and a third round, best-of-seven playoff series between the third-round winners.

The above example presumes that there are eight or more fantasy baseball teams competing in the fantasy baseball league: eight teams playing in the first round, four teams playing in the second round and two teams playing in the third round. If there are between four and seven teams, postseason service 232 determines that, based on fourteen of the available, fantasy game days, a postseason format can be created that approximates Major League Baseball's postseason with two best-of-seven rounds. Postseason service 232 creates a fantasy postseason schedule with two rounds of playoff series: a first round, best-of-seven, playoff series where four teams with the best records compete; and second round, best-of-seven playoff series between the first-round winners, consistent with various embodiments. If there are less than four teams, postseason service 232 determines that, based on seven of the available, fantasy game days, a postseason format can be created that approximates Major League Baseball's postseason with one best-of-seven rounds. Postseason service 232 creates a fantasy postseason schedule with a one round playoff series: a best-of-seven, playoff series where two teams with the best records compete, consistent with various embodiments.

As another example, the National Basketball Association's postseason consists of four rounds of playoff series: a first round, quarterfinal playoff series where sixteen teams with the best conference records compete; a second round, semifinal playoff series where the eight quarterfinal winners compete; a third round, final series where the four semifinal winners compete; and a fourth round, championship series between the two final winners. The four rounds are best-of-seven series. Postseason service 232 determines that sixteen fantasy teams and twenty-eight fantasy game days are required to emulate the National Basketball Association's postseason: twenty-eight fantasy game days for the four rounds of best-of-seven series.

In some embodiments, one to two actual game days are necessary to score fantasy basketball games on a given day. Fantasy basketball games may be scheduled four days per week, Monday thru Sunday. Fantasy game days are Tuesdays, Thursdays, Fridays and Sundays. The fantasy basketball regular season uses the fantasy game days in the first twenty-two weeks of the National Basketball Association's twenty-six-week regular season. The fantasy game days in the last four weeks of the regular season (weeks twenty-three thru twenty-six) are available to be used for the fantasy postseason.

Postseason service 232, consistent with various embodiments, determines that there are fifteen available, fantasy game days, which were not used for the fantasy regular season schedule, to create a fantasy postseason schedule. Postseason service 232 determines that a postseason format cannot be created that emulates an actual postseason because twenty-eight fantasy games are required. Postseason service 232 determines that, based on the fifteen available, fantasy game days, a postseason format of three rounds of best-of-five series can be created that approximates an actual postseason. Postseason service 232 creates a fantasy postseason schedule with three rounds of playoff series: a first round, best-of-five, playoff series where eight teams with the best records compete; a second round, best-of-five, playoff series where the four, first-round winners compete; and a third round, best-of-five, playoff series between the third-round winners.

The above example presumes that there are eight or more fantasy basketball teams competing in the fantasy basketball league: eight teams playing in the first round, four teams playing in the second round and two teams playing in the third round. If there are between four and seven teams, postseason service 232 determines that, based on fourteen of the available, fantasy game days, a postseason format can be created that approximates the National Basketball Association's postseason with two best-of-seven rounds. Postseason service 232 creates a fantasy postseason schedule with two rounds of playoff series: a first round, best-of-seven, playoff series where four teams with the best records compete; and second round, best-of-seven playoff series between the first-round winners, consistent with various embodiments. If there are less than four teams, postseason service 232 determines that, based on seven of the available, fantasy game days, a postseason format can be created that approximates the National Basketball Association's postseason with one best-of-seven round. Postseason service 232 creates a fantasy postseason schedule with a one round playoff series: a best-of-seven, playoff series where two teams with the best records compete, consistent with various embodiments.

Fantasy baseball season schedules and fantasy basketball season schedules are provided as illustrative examples only. Other fantasy sports, such as fantasy hockey, are currently and arbitrarily limited to a twenty-five-game schedule, one game per week over a twenty-five-week period. Some embodiments of the present invention provide for a fantasy hockey season schedule that emulates the National Hockey League's eighty-game regular season schedule and its postseason's four playoff rounds.

Scoring Service

Turning back to FIG. 2, scoring service 240, consistent with various embodiments, provides users, such as users 201, 202 and 203, with fantasy game scores that are based on carefully selected and weighted player statistics from single games in the sport on which the fantasy sport is based. Rather than relying on rudimentary statistics that produce unrealistic scores and are not predictive of success in actual games, scoring service 240 selects player statistics and corresponding point values so that the resulting game scores approximate scores, and are predictive of success, in the sport on which the fantasy sport is based.

Player statistics service 241, consistent with various embodiments, provides users, such as users 201, 202 and 203, with selected player statistics and corresponding, weighted point values that result in fantasy game scores that approximate games scores and are predictive of success in the sport on which the fantasy sport is based. Game scoring service 242 calculates a fantasy team's game score by summing the product of each selected player statistic with a corresponding weighted point value. Player statistics service 241 selects player statistics that are predictive of success in the sport on which the fantasy sport is based. Player statistics service 241 determines the selected player statistics' average values for a team in a game in the sport on which the fantasy sport is based. Player statistics service 241 determines the average score for a team in a game in the sport on which the fantasy sport is based. Player statistics service 241 determines weighted point values for each selected player statistic. The weights for each point value are chosen so that, when a fantasy team's player statistics are equal to average values, the fantasy team score is equal to an average team score. In this manner, fantasy game scores approximate actual games scores and are predictive of success in the actual sport.

For example, Major League Baseball publishes more than eighty-five player statistics, which include twenty-eight batting, forty-two pitching and fifteen fielding statistics. Major League Baseball publishes sums, averages and aggregations of these statistics in such categories as season, career and team. Player statistics service 241, consistent with various embodiments, selects for fantasy baseball twenty-four player statistics, which are shown in the table below, that are most predictive of success in Major League Baseball. In some embodiments, player statistics may be selected by users, such as a user acting as a fantasy baseball league manager.

Player statistics service 241 determines, using Major League Baseball's published, categorical averages, the selected player statistics' average values for a team in an actual game, consistent with various embodiments. Exemplar values are shown in the table below. For example, on average, a team's players hit singles 5.52 times per game. Player statistics service 241 determines, using Major League Baseball's published statistics, the average game score for an actual team. For example, in 2018, Major League Baseball teams scored, on average, approximately 4.4 to 4.5 runs per game.

Player statistics service 241 determines, using an algebraic formula, weighted point values for each selected player statistic, consistent with various embodiments. Player statistics service 241 weights the point values so that they produce an average team score (4.4 to 4.5 runs) when the team's player statistics are equal to average values. Exemplar values are shown in the table below. For example, the weighted point value for player statistic, single, is 0.10. When a fantasy team's statistic for singles in a given fantasy game is equal to the average, actual team statistic in an actual game (5.52), the fantasy team will receive 0.55 points for that statistic. As shown in the table below, the weighted point values produce a fantasy team score (4.45) that approximates an average actual team score (4.4 to 4.5) when the fantasy team's player statistics are equal to average values, consistent with various embodiments.

| PLAYER STATISTICS | AVG. TEAM STATISTIC PER GAME | WEIGHTED POINT VALUE | AVG. TEAM POINTS PER GAME |
|---|---|---|---|
| SINGLE (1B): no. of times batter hits ball & reaches 1st base without aid of error or fielder's choice | 5.52 | 0.10 | 0.55 |
| DOUBLE (2B): no. of times batter hits ball & reaches 2nd base without aid of error or fielder's choice | 1.72 | 0.20 | 0.34 |
| TRIPLE (3B): no. of times batter hits ball & reaches 3rd base without aid of error or fielder's choice | 0.16 | 0.30 | 0.05 |
| HOME RUN (HR): no. of times batter hits ball, reaches home plate & scores by hitting ball out of play in fair territory, or without aid of an error or fielder's choice | 1.26 | 0.40 | 0.5 |
| WALKS (BB): no. of walks by batter | 3.26 | 0.10 | 0.33 |
| CAUGHT STEALING (CS): no. of times player has been put out attempting to steal a base | 0.19 | −0.10 | −0.02 |
| ERRORS (E): no. of times player fails to convert an out on play that average fielder should have made; or allows one or more runners to advance on the bases. | 0.58 | −0.10 | −0.06 |
| GROUND INTO DOUBLE PLAYS (GDP): no. of times a batter has grounded into double play | 0.78 | −0.10 | −0.08 |
| HIT BY PITCH (HBP): no. of times batter has been hit by pitch | 0.36 | 0.10 | 0.4 |
| STRIKEOUTS (KO): no. of times batter strikes out | 8.27 | −0.05 | −0.41 |
| RUNS (R): no. of times base runner safely reaches home plate | 4.63 | 0.10 | 0.46 |
| RUNS BATTED IN (RBI): no. of runs that score safely due to batter hitting ball or drawing base on balls | 4.42 | 0.10 | 0.44 |
| STOLEN BASES (SB): no. of times player stole a base | 0.52 | 0.15 | 0.08 |
| WALKS ISSUED (BBI): no. of times pitcher issued a base on balls | 3.26 | −0.10 | −0.33 |
| BLOWN SAVES (BS): no. of times pitcher, who entered game as reliever in a save situation, allowed the tying run to score, whether that run was charged to pitcher or not | 0.12 | −0.45 | −0.06 |
| EARNED RUNS (ER): no. of times pitcher allowed an earned run | 4.31 | −0.10 | −0.43 |
| HITS ALLOWED (HA): no. of times pitcher allowed a hit | 8.66 | −0.10 | −0.87 |
| INNINGS PITCHED (INN): no. of times pitcher is credited for an inning (1/3 inning per recorded out) | 9.00 | 0.225 | 2.03 |
| STRIKEOUTS (K): no. of times pitcher struck out batter | 8.27 | 0.15 | 1.24 |
| LOSSES (L): no. times pitcher was charged with loss | 0.50 | −0.45 | −0.23 |
| QUALITY STARTS (QS): no. of times pitcher, who entered game as starter, pitched at least six innings & allowed three earned runs or less | 0.44 | 0.45 | 0.20 |
| SAVES (S): no. of times pitcher was credited save | 0.24 | 0.90 | 0.22 |
| WINS (W): no. of times pitcher was credited win | 0.50 | 0.90 | 0.45 |
| AVERAGE FANTASY TEAM SCORE PER GAME: | — | — | 4.45 |

In another example, consistent with various embodiments, the National Basketball Association publishes well over a hundred player statistics, which include scoring, shooting, defense, opponent and usage statistics. The National Basketball Association publishes sums, averages and aggregations of these statistics in such categories as season, career and team. Player statistics service 241, consistent with various embodiments, selects for fantasy basketball thirteen player statistics, which are shown in the table below, that are most predictive of success in the National Basketball Association. In some embodiments, player statistics may be selected by users, such as a user acting as a fantasy basketball league manager.

Player statistics service 241 determines, using an algebraic formula, the National Basketball Association's published, categorical averages, the selected player statistics' average values for a team in an actual game, consistent with various embodiments. Exemplar values are shown in the table below. For example, on average, a team's players assist with a field goal 12.20 times per game. Player statistics service 241 determines, using the National Basketball Association's published statistics, the average game score for an actual team. For example, in the 2017-2018 season, National Basketball Association teams scored, on average, approximately 105 points per game.

Player statistics service 241 determines, using weighted point values for each selected player statistic, consistent with various embodiments. Player statistics service 241 weights the point values so that they produce an average team score (105 points) when the team's player statistics are equal to average values. Exemplar values are shown in the table below. For example, the weighted point value for player statistic, assists, is 1.75. When a fantasy team's statistic for assists in a given fantasy game is equal to the average, actual team statistic in an actual game (12.20), the fantasy team will receive 21.35 points for that statistic. As shown in the table below, the weighted point values produce a fantasy team score (105.43) that approximates an average actual team score (105) when the fantasy team's player statistics are equal to average values, consistent with various embodiments.

Game scoring service 242, consistent with various embodiments, provides users, such as users 201, 202 and 203, with fantasy game scores that are derived from player statistics from an actual game in the sport on which the fantasy sport is based. Game scoring service 242 determines a fantasy game score by totaling the point values for the players on each team's starting lineup. A player's point value is the sum of the point values for that player's published player statistics from an actual game which correspond to the selected statistics and weighted point values determined by player statistics service 241. For example, consistent with various embodiments, number of home runs is a player statistic selected in a fantasy baseball league and assigned a point value of 0.4. A player on a fantasy baseball team's starting lineup hits three home runs in a corresponding Major League Baseball game. The point value for that player will include 1.2 points (or 3 home runs times 0.4 points). A team's score is the sum of the point values of the players on its starting lineup (e.g., 10 in fantasy baseball). A fantasy game score is each team's score (e.g., 10 to 6 in fantasy baseball). The team with the highest score wins the fantasy game.

Game scoring service 242, consistent with various embodiments, provides users, such as users 201, 202 and 203, with fantasy game scores that accommodate circumstances where player statistics and their corresponding point values for one or more players on a fantasy team's starting lineup are not available from an actual game in the sport on which the fantasy sport is based. In that circumstance, consistent with various embodiments and depending on a given fantasy league's rules, game scoring service 242 may take one of several actions: leave the game score open and calculate point values when the unavailable player statistics and their corresponding point values are available; calculate point values by substituting the unavailable player statistics with player statistics and corresponding point values for a player in the user-designated position of spot starter; and calculating point values by setting the corresponding point

| PLAYER STATISTICS | AVG. TEAM STATISTIC PER GAME | WEIGHTED POINT VALUE | AVG. TEAM POINTS PER GAME |
|---|---|---|---|
| ASSISTS (AST): no. of times player assisted with a field goal | 12.20 | 1.75 | 21.35 |
| BLOCKS (BK): no. of times player blocked an attempted field goal | 2.60 | 4 | 10.40 |
| STEALS (STL): no. of times defensive player takes ball from offensive player | 4.20 | 4 | 16.80 |
| REBOUNDS (REB): no. of times player recovers ball after missed field goal | 23.50 | 1 | 23.50 |
| TURNOVERS (TO): no. of times player on offense loses ball to player on defense | 7.50 | −1.75 | −13.13 |
| TWO-POINT SHOTS MADE (2PM): no. of times player made a 2-pt. field goal | — | see below | — |
| THREE-POINT SHOTS MADE (3PM): no. of times player made 3-pt. field goal | — | see below | — |
| FIELD GOAL ATTEMPTS (FGA): no. of times player attempted a field goal | — | see below | — |
| ADJ. FIELD GOAL PERCENT. (AFGP): calculated stat.: ((2PM + 3PM + 0.5) * 3PM)/FGA | — | see below | — |
| Calculated stat.: ((2PM * 2) + (3PM * 3)) * AFGP | 24.30 | 1.5 | 36.45 |
| FREE THOWS ATTEMPTED (FTA): no. of times player attempted a free throw | — | see below | — |
| FREE THROWS MADE (FTM): no. of times player made a free throw | — | see below | — |
| Calculated stat.: FTA − FTM | 6.70 | 1.5 | 10.05 |
| AVERAGE FANTASY TEAM SCORE PER GAME: | — | — | 105.43 | values for the unavailable player statistics to the value of zero. In some embodiments, actions to be taken may be selected by users, such as a user acting as a fantasy league manager.

Game scoring service 242 allows scoring for a fantasy game to remain open until statistics and their corresponding point values for all players on each fantasy team's starting lineup are available from a corresponding actual game in the sport on which the fantasy sport is based, consistent with various embodiments. For example, a user may assign a player to the starting lineup for fantasy game ten, which is the tenth scheduled game in the fantasy league, regular season schedule, that corresponds to actual game ten, which is the tenth schedule game in the actual, regular season schedule. However, the player did not play in actual game ten. The player played in actual game eleven. In some embodiments, the scoring for fantasy game ten remains open until the statistics for the player are available from actual game eleven. At that time, the points corresponding to the player's statistics in actual game eleven are allocated to the score of fantasy game ten. In this manner, once the statistics for each player on the fantasy teams' starting lineups are available from a corresponding actual game, the scoring for the fantasy game is completed, consistent with various embodiments.

In another example, Major League Baseball teams have five starting pitchers in their active rosters who pitch in rotation in a manager-designated sequence (games one thru five). In the present invention, fantasy baseball teams have five starting pitchers in their active rosters who pitch in rotation in a user-designated sequence (games one thru five). To score a fantasy baseball game, a fantasy pitcher's rotation sequence does not need to occur in the same game as the actual pitcher's rotation sequence.

Game scoring service 242, consistent with various embodiments, leaves a fantasy game's score open until the starting pitchers for each team, as determined by the fantasy pitching rotation, have started in their corresponding, actual pitching rotation.

For example, a user may assign a starting pitcher a fantasy rotation sequence number of two, which corresponds to a fantasy game on a Tuesday, which has a fantasy game rotation sequence number of two. However, a Major League Baseball team manager may assign that starting pitcher an actual rotation sequence number of four, which corresponds to an actual game on the following Thursday, which has an actual game rotation sequence number of four). Once the starting pitcher has pitched in Thursday's actual game, his player statistics are allocated to the score of the previous Tuesday's fantasy game. In this manner, scores for as many as five games could be open at any given time. Once both fantasy teams' starting pitchers have completed their actual starts and once the date of the given fantasy game has passed (thereby ensuring that the statistics are compiled for all of the position players selected for that game), the scoring for the fantasy game ends and its score is final, consistent with various embodiments.

Game scoring service 242 provides users, such as users 201, 202 and 203, with game scores that use player statistics and the corresponding point values for the user-designated position, spot starter, on their fantasy team's active rosters, consistent with various embodiments. Spot starters are used when a player on a fantasy team's starting lineup does not play in a corresponding actual game in the sport on which the fantasy sport is based. For example, a user may have a spot starter on that user's active roster. The user may assign a player to the starting lineup for fantasy game ten, which is the tenth scheduled game in the fantasy league, regular season schedule, that corresponds to actual game ten, which is the tenth schedule game in the actual, regular season schedule. However, the player did not play in actual game ten. In some embodiments, the points corresponding to the player statistics for the spot starter in actual game ten are allocated to the score of fantasy game ten. In this manner, the scoring for the fantasy game is completed when statistics are not available for a player on the starting lineup, consistent with various embodiments.

In another example, Major League Baseball teams use spot starters, who are pitchers on the active roster designated to back up a starting pitcher from time-to-time, due to injury or some other reason.

Active roster service 221 allows users, such as users 201, 202 and 203, to assign a spot starter on their active rosters of players for fantasy baseball teams. Game scoring service 242, consistent with various embodiments, uses a fantasy team's spot starter's statistics in determining a fantasy game score when one of the five starting pitchers on that fantasy team did not make their scheduled actual start or were not scheduled for enough actual starts to cover a particular week's fantasy games. If a starting pitcher missed an actual start, or if there were not enough actual starts from a starting pitcher in a given week to cover that week's fantasy games, the spot starter's statistics are used. If no starting pitcher missed an actual turn in the rotation and starts from the actual pitching rotations covered a particular week's fantasy games, the spot starter's statistics are not used, consistent with various embodiments.

Game scoring service 242 provides users, such as users 201, 202 and 203, with game scores that use the value of zero for points corresponding to player statistics that are not available for a player on a starting lineup, consistent with various embodiments. For example, a user may assign a particular player to the starting lineup for fantasy game ten, which is the tenth scheduled game in the fantasy league, regular season schedule, that corresponds to actual game ten, which is the tenth schedule game in the actual, regular season schedule. However, the player did not play in actual game ten. In some embodiments, the points corresponding to the player statistics are set to the value of zero. In this manner, the scoring for the fantasy game is completed when statistics are not available for a player on the starting lineup, consistent with various embodiments.

Lineup service, such as lineup service 220, scheduling service, such as scheduling service 230, and scoring service, such as scoring service 240, may be accessed using a variety of devices, including a desktop computer, a laptop computer, a smartphone, or a tablet PC. They may also be accessed using a web browser installed on user devices. Further, the fantasy sports service environment 200 is platform agnostic, that is, users may compete in head-to-head fantasy sports from devices running on operating systems, such as Microsoft Corporation's Windows, Apple Inc.'s macOS® and iOS®, Google Inc.'s Chrome OS™ operating systems, and various implementations of the Android OS operating system.

Example System for Fantasy Sports Service

Figure 3:
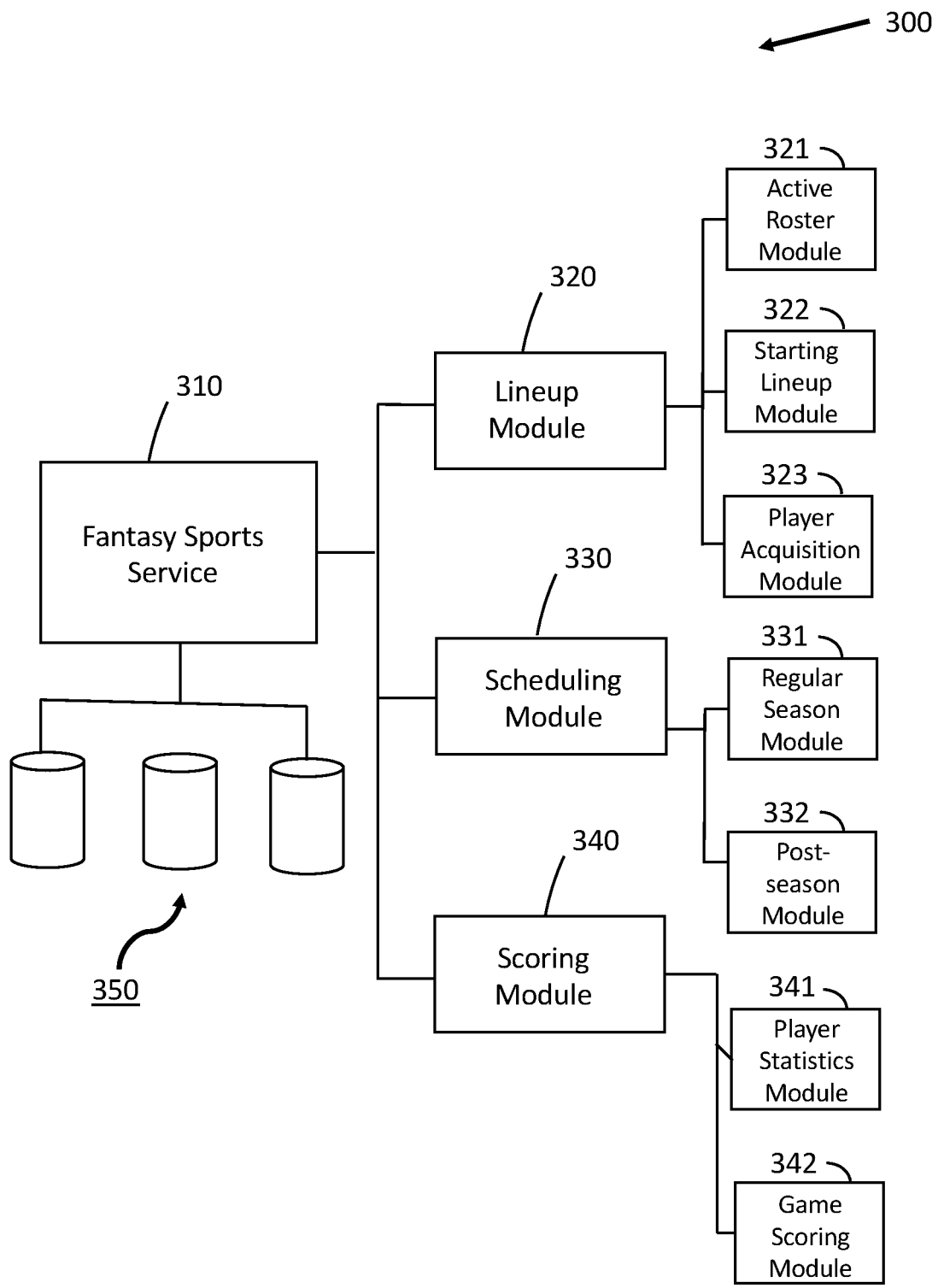
FIG. 3 is a block diagram of a system for a fantasy sports service of FIG. 1, consistent with various embodiments.

Turning now to FIG. 3, FIG. 3 is a block diagram of a system for a fantasy sports service of FIG. 1, consistent with various embodiments.

In various embodiments, system 300 is implemented to perform functions such as the functions of environment 100. In various embodiments, fantasy sports service 310 may be similar to fantasy sports service 120 of FIG. 1. Fantasy sports service 310 includes various modules that provide services including lineup services, scheduling services and scoring services.

Fantasy sports service 310 includes lineup module 320, scheduling module 330 and scoring module 340. In various embodiments, lineup module 320 may be similar to lineup service 121 of FIG. 1. Lineup module 320 includes modules to manage fantasy team lineups. These modules may be similar to the lineup services of FIG. 2. Active roster module 321 may be similar to active roster service 221 of FIG. 2. Active roster module 321 facilitates the user to select an active team roster in a fantasy league. Starting lineup module 322 may be similar to starting lineup service 222 of FIG. 2. Starting lineup module 322 facilitates the user to select starting lineups in a fantasy game. Player acquisition module 323 may be similar to player acquisition service 223 of FIG. 2. Player acquisition module 323 facilitates the user to acquire players during a fantasy season.

In various embodiments, scheduling module 330 may be similar to scheduling service 122 of FIG. 1. Scheduling module 330 includes modules to schedule a fantasy season. These modules may be similar to scheduling services of FIG. 2. Regular season module 331 may be similar to regular season service 231 of FIG. 2. Regular season module 331 facilitates the provision of a fantasy regular season schedule to users. Postseason module 332 may be similar to postseason service 232 of FIG. 2. Postseason module 332 facilitates the provision of a fantasy postseason schedule to users.

In various embodiments, scoring module 340 may be similar to scoring service 123 of FIG. 1. Scoring module 340 includes modules to score a fantasy game. These modules may be similar to scoring services of FIG. 2. Player statistics module 341 may be similar to player statistics service 241 of FIG. 2. Player statistics module 341 facilitates the provision of player statistics and associated point to users. Game scoring module 342 may be similar to game scoring service 242 of FIG. 2. Game scoring module 342 facilitates the provision of game scores to users.

Figure 4:
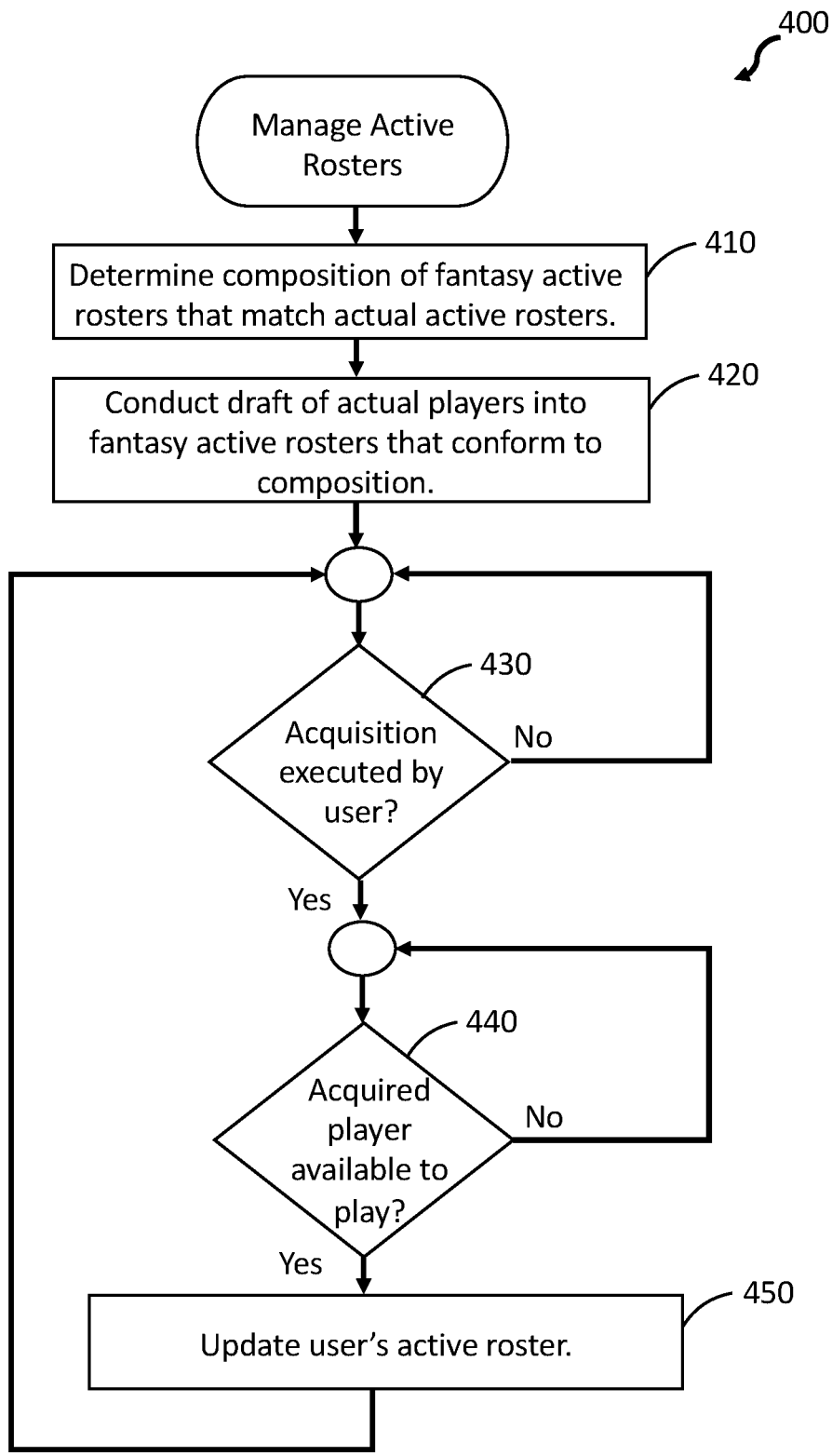
FIG. 4 is a flow diagram of a process of managing active rosters, consistent with various embodiments.

Turning now to FIG. 4, FIG. 4 is a flow diagram of a process of managing active rosters, consistent with various embodiments.

In some embodiments, process 400 may be executed in a system such as system 300 of FIG. 3. At block 410, active roster module 321 determines the composition, in number of players and positions, of fantasy active rosters that match actual active rosters in the sport on which the fantasy sport is based. For example, consistent with various embodiments, a fantasy baseball active roster is composed of twenty-five players allocated to the following positions: five infielders (catcher, first, second and third basepersons, and shortstop), three outfielders (left, center and right fielders); nine pitchers (five starting pitchers who pitch in rotation in a user-designated sequence, two relievers, one closer and one spot starter who is used for scoring if necessary); one designated hitter; and seven bench players (allocated to any position).

At block 420, active roster module 321 conducts a draft by users of actual players into their respective fantasy active rosters that conform to the pre-determined composition. At block 430, active roster module 321 determines whether a user has successfully executed an acquisition. For example, consistent with various embodiments, player acquisition module 323 allows users to acquire by free agency or by trade. Free agents are players not currently on any fantasy team's roster. Users may agree to trade players on their active rosters for players on another user's active rosters.

If an acquisition was successfully executed, at block 440, active roster module 321 determines whether the acquired player is available to play in a game. For example, consistent with various embodiments, the fantasy league may have time restrictions on when acquired players can play. In some embodiments, players acquired as free agents or thru trades are not available to be selected for starting lineups until the Monday after their acquisition. If available to play, at block 450, active roster module 321 updates the user's active roster by adding the acquired player and cutting a corresponding player.

Figure 5:
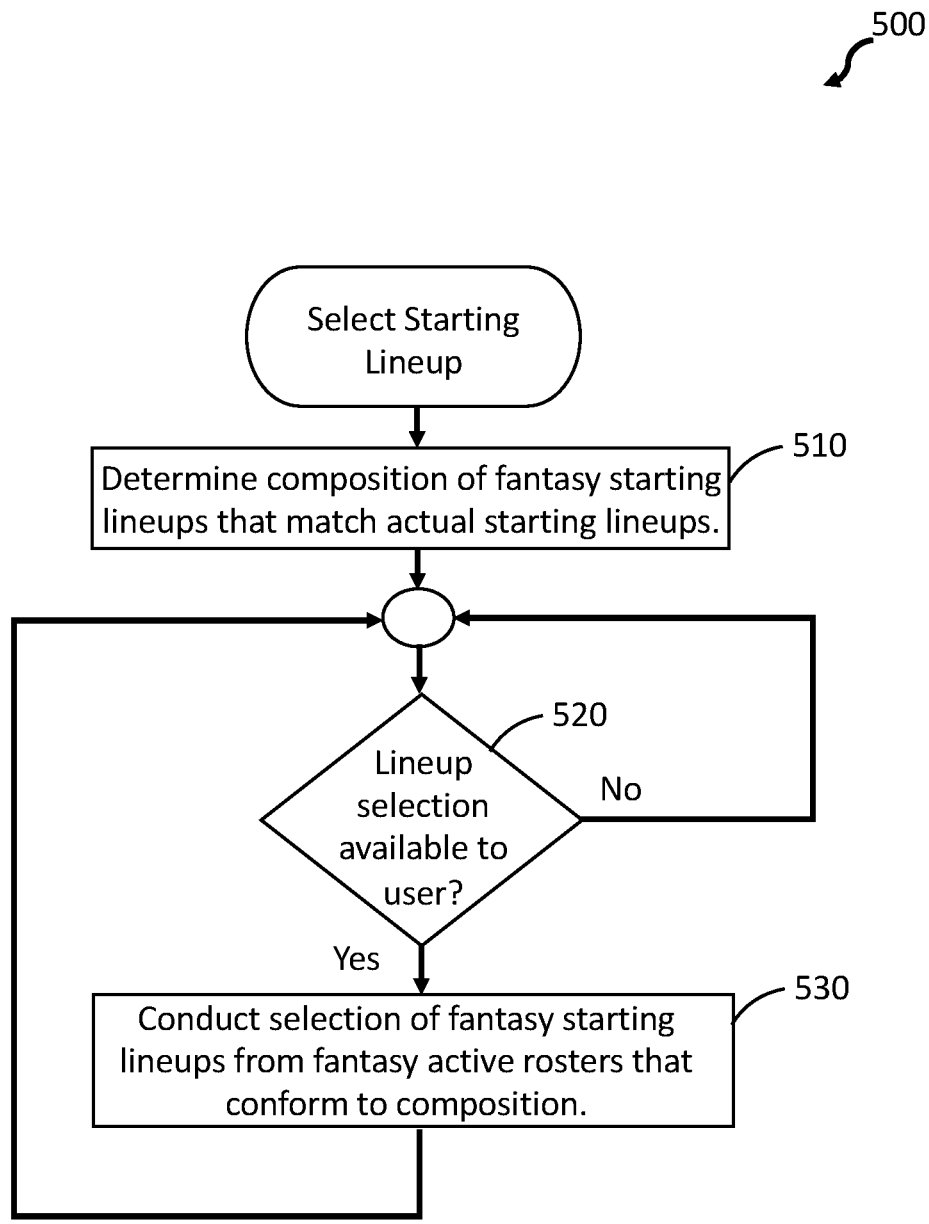
FIG. 5 is a flow diagram of a process of selecting starting lineups, consistent with various embodiments.

Turning now to FIG. 5, FIG. 5 is a flow diagram of a process of selecting a starting lineup, consistent with various embodiments.

In some embodiments, process 500 may be executed in a system such as system 300 of FIG. 3. At block 510, starting lineup module 322 determines the composition in position players of fantasy starting lineups that match actual starting lineups in the sport on which the fantasy sport is based. For example, consistent with various embodiments, a fantasy basketball starting lineup consists of selecting five starting players for the five court positions (point guard, shooting guard, small forward, power forward and center) and four rotating players in any combination of position players that includes no more than one rotating center.

At block 520, starting lineup module 322 determines whether a user may select a starting lineup or portions of a starting lineup. For example, consistent with various embodiments and a given fantasy basketball league's rules, users may select a starting lineup for each game. If users may select a lineup or portions thereof, at block 530, starting lineup module 322 conducts a selection by users of their fantasy starting lineups from their respective fantasy active rosters that conform to the pre-determined composition.

Figure 6:
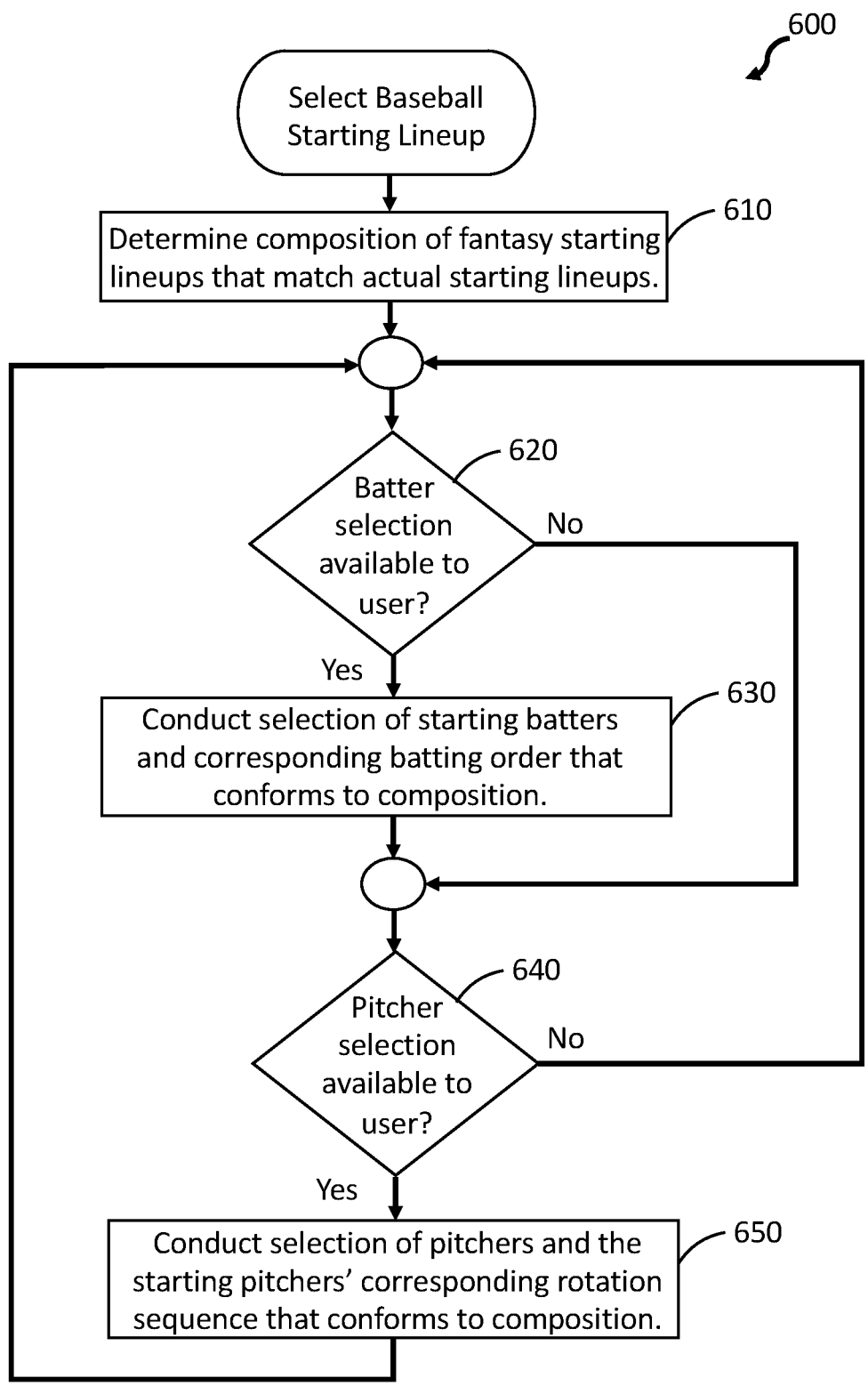
FIG. 6 is a flow diagram of a process of selecting starting lineups for fantasy baseball, consistent with various embodiments.

Turning now to FIG. 6, FIG. 6 is a flow diagram of a process of selecting a starting lineup for fantasy baseball, consistent with various embodiments.

In some embodiments, process 600 may be executed in a system such as system 300 of FIG. 3. At block 610, starting lineup module 322 determines the composition in position players of fantasy starting lineups that match actual starting lineups in the type of baseball on which the fantasy sport is based. For example, consistent with various embodiments, a fantasy baseball starting lineup is composed of nine batters and five pitchers. Each of the nine batters bat in a user-designated batting order (one thru nine). The nine batters are composed of five infielders, three outfielders and one designated hitter. The infielders are composed of a catcher, a first, second and a third baseperson, and a shortstop. The outfielders are composed of a left, center and a right fielder. The five pitchers are composed of a starting pitcher, two relief pitchers, a closer and a spot starter. The starting pitcher is one of five starting pitchers on an active roster who pitch in rotation in a user-designated sequence (one thru five). The spot starter is used as necessary for scoring when, e.g., an actual starting pitcher misses a start.

At block 620, starting lineup module 322 determines whether a user may select batters in a starting lineup. For example, consistent with various embodiments and a given fantasy baseball league's rules, users may select batters and their corresponding batting order for a fixed duration. In some embodiments, the duration is a game in a fantasy season. If users may select batters, at block 630, starting lineup module 322 conducts a selection by users of batters and their corresponding batting order (one thru nine) in the users' fantasy starting lineups from their respective fantasy active rosters that conform to the pre-determined composition.

At block 640, starting lineup module 322 determines whether a user may select pitchers in a starting lineup. For example, consistent with various embodiments and a given fantasy baseball league's rules, users may select pitchers and the starting pitchers' corresponding rotation sequence for a fixed duration. In some embodiments, the duration is five games in succession in a fantasy season. If users may select pitchers, at block 650, starting lineup module 322 conducts a selection by users of pitchers (starting pitchers, relief pitchers, closer and spot starter) and their starting pitchers' corresponding rotation sequence (games one thru five) in the users' fantasy starting lineups from their respective fantasy active rosters that conform to the pre-determined composition. Users may also select one of their starting pitchers as a two-start pitcher. For example, if there are six games in one week of a fantasy baseball's schedule, a user may select a starting pitcher as a two-starter pitcher in a corresponding rotation sequence (games one thru six). That two-start pitcher will start in two games, such as game one and game six, in that week's schedule, consistent with various embodiments.

Figure 7:
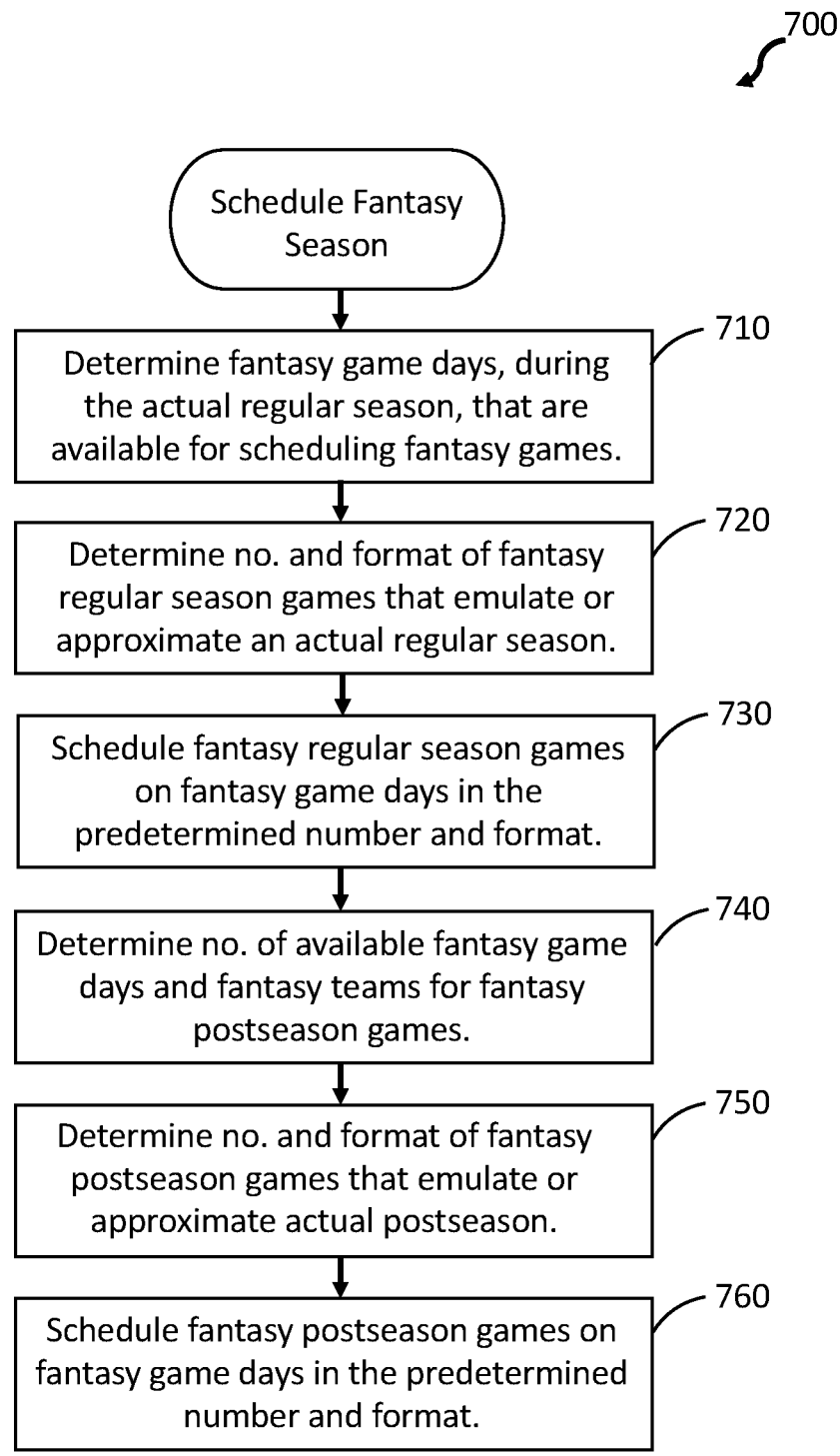
FIG. 7 is a flow diagram of a process of scheduling games for a fantasy sport regular and postseason, consistent with various embodiments.

Turning now to FIG. 7, FIG. 7 is a flow diagram of a process of scheduling a fantasy season, consistent with various embodiments.

In some embodiments, process 700 may be executed in a system such as system 300 of FIG. 3. At block 710, scheduling module 330 determines the week days and total number of days that are fantasy game days during an actual regular season in the actual sport on which the fantasy sport is based, consistent with various embodiments. For example, in some embodiments, one actual game day in Major League Baseball is necessary to ensure statistics for most players will be available to score fantasy baseball games on a given day. There may therefore be seven fantasy game days per week. Fantasy game days for fantasy baseball are Mondays, Tuesdays, Wednesdays, Thursdays, Fridays, Saturdays and Sundays, excluding the All-Star Break, during Major League Baseball's regular season. The total number of available fantasy game days is one hundred, eight-three. In another example, in some embodiments, one to two actual game days are necessary to ensure statistics for most players will be available to score fantasy basketball games on a given day. There may therefore be four fantasy game days per week. Fantasy game days for fantasy basketball are Tuesdays, Thursdays, Fridays and Sundays, excluding All-Star Week and Christmas Eve, during the National Basketball Association's regular season. The total number of available fantasy game days is ninety-seven.

At block 720, regular season module 331, using the total number of fantasy game days, determines a number and format of fantasy regular season games that emulate or approximate the number and format of actual regular season games in the actual sport on which the fantasy sport is based, consistent with various embodiments. For example, in some embodiments, regular season module 331 determines that the one hundred, eight-three, available fantasy baseball game days can be used to schedule one-hundred, sixty-two fantasy baseball regular season games for each fantasy team, which emulates the number of Major League Baseball regular season games for each actual team. Regular season module 331 uses the one-hundred, sixty-two fantasy baseball, regular season games for each fantasy team to schedule games in a format where fantasy baseball teams play each other in three- or four-game series in succession, which emulates the format of Major League Baseball regular season games.

In another example, in some embodiments, regular season module 331 uses the ninety-seven, available fantasy basketball game days to schedule eighty-two fantasy basketball regular season games for each fantasy team, which emulates the number of the National Basketball Association regular season games for each actual team. Regular season module 331 uses the eighty-two, fantasy basketball, regular season games for each fantasy team to schedule games in a format where fantasy basketball teams play each other in single games in succession, which emulates the format of the National Basketball Association regular season games.

At block 730, regular season module 331, schedules fantasy games in the predetermined number and format of fantasy regular season games on the fantasy game days, consistent with various embodiments. For example, in some embodiments, regular season module 331 schedules one-hundred, sixty-two fantasy baseball regular season games for each fantasy team where fantasy baseball teams play each other in three- or four-game series in succession. In another example, in some embodiments, regular season module 331 schedules eighty-two fantasy basketball regular season games for each fantasy team where fantasy basketball teams play each other in single games in succession.

At block 740, postseason module 332 determines the number of fantasy game days available for use in a fantasy postseason which were not used for the corresponding, fantasy regular season, consistent with various embodiments. For example, in some embodiments, fantasy baseball game days are Monday, Tuesday, Wednesday, Thursday, Friday, Saturday and Sunday, excluding the All-Star Break. The total number of fantasy baseball game days is one hundred, eighty-three. The corresponding fantasy baseball regular season used one-hundred and sixty-two fantasy game days over the first twenty-four weeks of Major League Baseball's twenty-seven-week regular season. Postseason module 332 determines that there are twenty-one available fantasy game days over the last three weeks of Major League Baseball's regular season.

In another example, in some embodiments, fantasy basketball game days are Tuesday, Thursday, Friday and Sunday, excluding All-Star Week and Christmas Eve. The total number of fantasy basketball game days is ninety-seven. The corresponding fantasy basketball regular season used eighty-two fantasy game days over the first twenty-two weeks of the National Basketball Association's twenty-six-week regular season. Postseason module 332 determines that there are fifteen available fantasy game days over the last four weeks of the National Basketball Association's regular season.

At block 750, postseason module 332, using the number of available fantasy game days and the number of available fantasy teams, determines a number and a format of fantasy postseason games that emulate or approximate the number and format of actual postseason games in the actual sport on which the fantasy sport is based, consistent with various embodiments. For example, in some embodiments, postseason module 332, determines that eight fantasy teams and nineteen fantasy game days are required to emulate Major League Baseball's forty-one game, three-round, postseason: five fantasy game days for the best-of-five series where eight teams with the best divisional records compete in up to twenty games, seven fantasy game days for the best-of-seven series where the four, round one winners compete in up to fourteen games, and seven fantasy game days for the best-of-seven series where the two, round two winners compete in up to seven games.

In some embodiments, there are twenty-one, available fantasy game days to emulate the number and format of Major League Baseball's postseason games. Presuming eight or more fantasy teams, postseason module 332 determines that a number and a format of fantasy postseason games can emulate the three-round format of Major League Baseball's postseason games. Forty-one fantasy postseason games over nineteen fantasy game days in a three-round format will emulate the number and format of Major League Baseball's postseason games. In some embodiments, where there are fewer than eight fantasy teams, postseason module 332 determines that twenty-one or seven fantasy postseason games with two or one rounds, respectively, will approximate the number and format of Major League Baseball's postseason games.

In another example, in some embodiments, postseason module 332, determines that sixteen fantasy teams and twenty-eight fantasy game days are required to emulate the National Basketball Association's one-hundred and five game, four-round postseason: seven fantasy game days for the first round, best-of-seven series where sixteen teams with the best conference records compete in up to fifty-six games, seven fantasy game days for the best-of-seven series where the eight, round one winners compete in up to twenty-eight games, seven fantasy game days for the best-of-seven series where the four, round two winners compete in up to fourteen games, and seven fantasy game days for the best-of-seven series where the two, round three winners compete in up to seven games.

In some embodiments, there are fifteen, available fantasy game days to emulate the number and format of the National Basketball Association's postseason games. Postseason module 332 determines that a number and a format of fantasy postseason games cannot emulate the four-round format of the National Basketball Association's postseason games. Presuming eight or more fantasy teams, postseason module 332 determines that a postseason format of three rounds of best-of-five series will approximate the multi-round format of the National Basketball Association's postseason games: five fantasy game days for the best-of-five series where eight teams with the best divisional records compete in up to twenty games, five fantasy game days for the best-of-five series where the four, round one winners compete in up to ten games, and five fantasy game days for the best-of-five series where the two, round two winners compete in up to five games. Thirty-five fantasy postseason games over fifteen fantasy game days in a three-round format will approximate the number and format of the National Basketball Association's postseason games.

In some embodiments, where there are fewer than eight fantasy teams, postseason module 332 determines that a format of fantasy postseason games of fewer than three rounds will approximate the four-round format of the National Basketball Association's postseason games.

At block 760, postseason module 332, using the predetermined number and format for fantasy postseason games, schedules fantasy postseason games on the available fantasy game days, consistent with various embodiments. For example, in some embodiments, postseason service 332 schedules fantasy baseball postseason games in three rounds of playoff series when there are eight or more fantasy teams: a first round, best-of-five, playoff series where eight teams with the best records compete; a second round, best-of-seven, playoff series where the four, first-round winners compete; and a third round, best-of-seven playoff series between the third-round winners. When there are fewer than eight fantasy teams, postseason module 332 schedules fantasy postseason games in less than three rounds of playoff series.

In another example, in some embodiments, postseason service 332 schedules fantasy basketball postseason games in three rounds of playoff series when there are eight or more fantasy teams: a first round, best-of-five, playoff series where eight teams with the best records compete; a second round, best-of-five, playoff series where the four, first-round winners compete; and a third round, best-of-five, playoff series between the third-round winners. When there are fewer than eight fantasy teams, postseason module 332 schedules fantasy postseason games in less than three rounds of playoff series.

Figure 8:
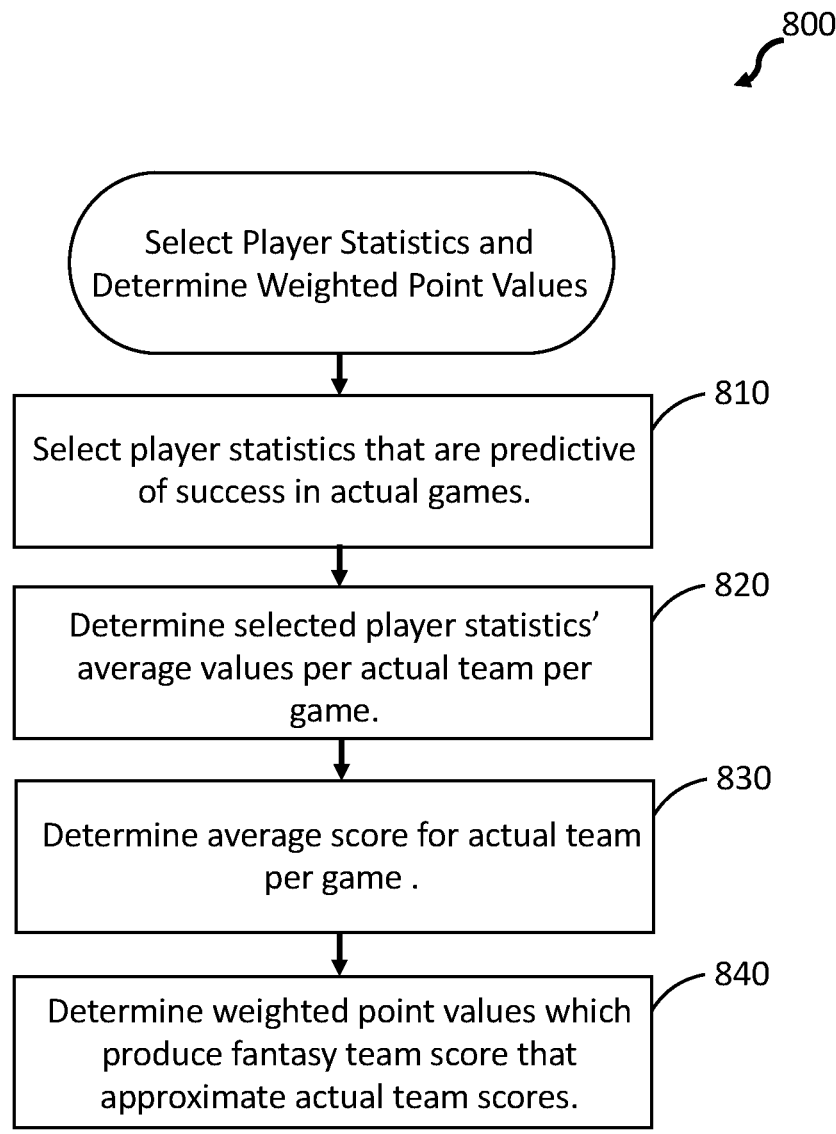
FIG. 8 is a flow diagram of a process of selecting player statistics and determining weighted point values for scoring a fantasy game, consistent with various embodiments.

Turning now to FIG. 8, FIG. 8 is a flow diagram of a process of selecting player statistics and determining weighted point values for scoring a fantasy game, consistent with various embodiments.

In some embodiments, process 800 may be executed in a system such as system 300 of FIG. 3. At block 810, player statistics module 341 selects player statistics that are predictive of success in actual games in the sport on which the fantasy sport is based, consistent with various embodiments. For example, Major League Baseball publishes eighty-five player statistics. In some embodiments, player statistics module 341 selects twenty-four of the eighty-five player statistics that are most predictive of success in Major League Baseball. In another example, the National Basketball Association publishes well over one hundred player statistics. In some embodiments, player statistics module 341 selects thirteen of the published statistics that are most predictive of success in the National Basketball Association. In some embodiments, player statistics module 341 facilitates selection of player statistics by users.

At block 820, player statistics module 341 determines average values, which are associated with the selected player statistics, for a team in a game in the actual sport on which the fantasy sport is based, consistent with various embodiments. For example, Major League Baseball publishes sums, averages and aggregations of player statistics in such categories as season, career and team. In some embodiments, player statistics module 341 uses the published, categorical averages to determine the selected player statistics' average values for a team in a Major League Baseball game. In another example, the National Basketball Association publishes sums, averages and aggregations of player statistics in such categories as season, career and team. In some embodiments, player statistics module 341 uses the published, categorical averages to determine the selected player statistics' average values for a team in the National Basketball Association.

At block 830, player statistics module 341 determines the average score for a team in a game in the actual sport on which the fantasy sport is based, consistent with various embodiments. For example, the average score for a Major League Baseball team in 2018 was 4.4 to 4.5 runs per game. In some embodiments, player statistics module 341 uses Major League Baseball's published statistics to determine the average score for a team in a baseball game. In another example, the average score for a National Basketball Association team in the 2017-2018 season was 105 points per game. In some embodiments, player statistics module 341 uses the National Basketball Association's published statistics to determine the average score for a team in a basketball game.

At block 840, player statistics module 341 determines, using an algebraic formula, weighted point values corresponding to the selected player statistics, consistent with various embodiments. Player statistics module 341 weights the point values so that they produce an average team game score when a fantasy team's player statistics are equal to average values. For example, the average score for a Major League Baseball team in 2018 was 4.4 to 4.5 runs per game. In some embodiments, player statistics module 341 selects twenty-four player statistics. Player statistics module 341 weights the point values corresponding to those statistics so that, when a fantasy baseball team's statistics are equal to average values, that fantasy team's game score is equal to 4.45. In another example, the average score for a National Basketball Association team in the 2017-2018 season was 105 points per game. In some embodiments, player statistics module 341 selects thirteen player statistics. Player statistics module 341 weights the point values corresponding to those statistics so that, when a fantasy basketball team's statistics are equal to average values, that fantasy team's game score is equal to 105.

Figure 9:
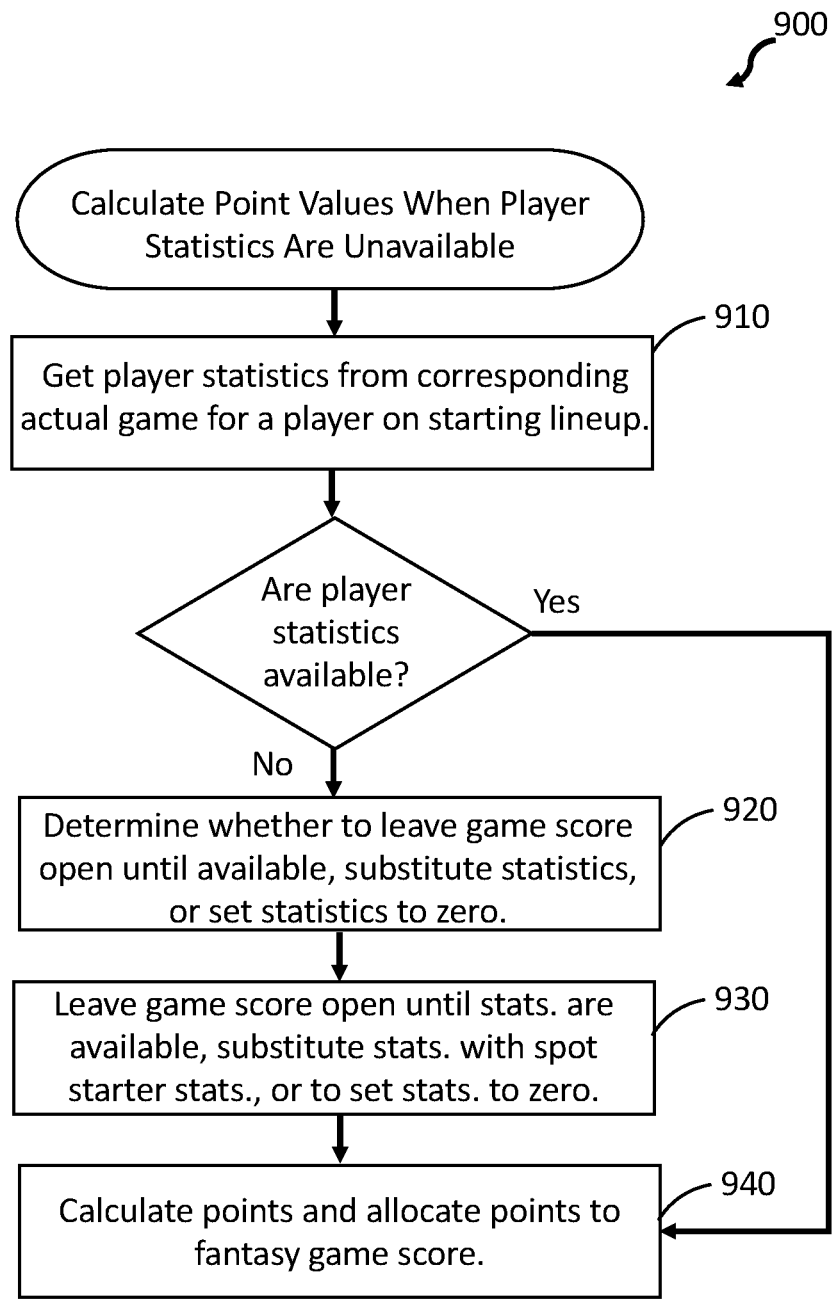
FIG. 9 is a flow diagram of a process of calculating point values for a player on a fantasy team's starting lineup when player statistics are unavailable, consistent with various embodiments.

Turning now to FIG. 9, FIG. 9 is a flow diagram of a process of calculating point values for a player on a fantasy team's starting lineup under circumstances where the player's player statistics are not available from an actual game, consistent with various embodiments.

In some embodiments, process 900 may be executed in a system such as system 300 of FIG. 3. At block 910, game scoring module 342 gets player statistics for a player on a starting lineup in a fantasy game from a corresponding actual game. For example, Major League Baseball publishes eighty-five player statistics for every baseball game. If player statistics are available for the player, at block 940, game scoring module 342 calculates the corresponding points and allocates those points to the fantasy game score. For example, in some embodiments, number of home runs is a player statistic selected in a fantasy baseball league and assigned a point value of 0.4. A player on a fantasy baseball team's starting lineup hits three home runs in a corresponding Major League Baseball game. The point value for that player will include 1.2 points (or 3 home runs times 0.4 points). 1.2 points will be allocated to the fantasy game score for that fantasy baseball team.

If player statistics are not available for the player, at block 920, game scoring module 342 determines which action to perform. For example, a user may assign a player to the starting lineup for fantasy game ten, which is the tenth scheduled game in the fantasy league, regular season schedule, that corresponds to actual game ten, which is the tenth scheduled game in the actual, regular season schedule. However, the player did not play in actual game ten. The player statistics are not available to use in scoring fantasy game ten.

Game scoring module 342 may leave the game score open and get player statistics when the unavailable player statistics become available. Continuing the preceding example, if the player played in actual game eleven, the scoring for fantasy game ten remains open until the statistics for the player are available from actual game eleven. At that time, the players statistics in actual game eleven are available to use in scoring fantasy game ten. Game scoring module 342 may substitute the unavailable player statistics with player statistics for a player in the user-designated position of spot starter. Continuing the preceding example, the unavailable player statistics are substituted with the player statistics for the spot starter in actual game ten. Game scoring module 342 may set the unavailable player statistics to the value of zero.

At block 930, game scoring module 342 performs the determined action thereby providing values for the unavailable player statistics. At block 940, game scoring module 342, calculates the corresponding points and allocates those points to the fantasy game score.

Figure 10:
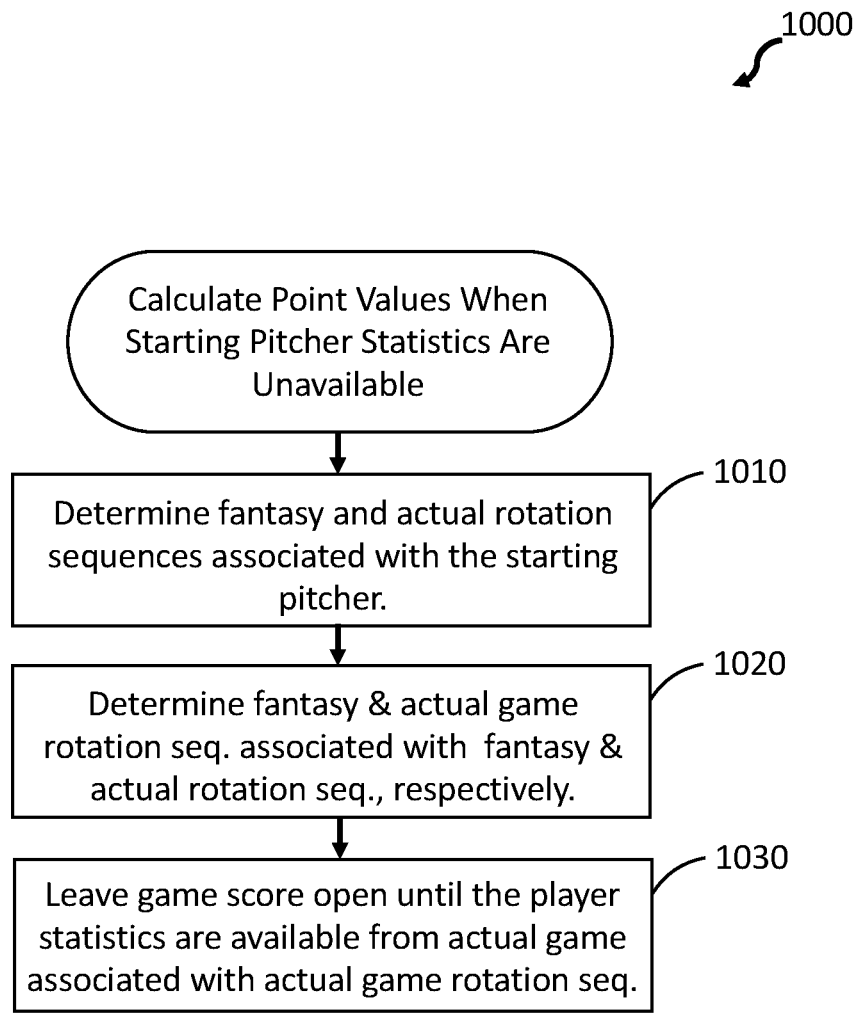
FIG. 10 is a flow diagram of a process of calculating point values for a starting pitcher on a fantasy baseball team's starting lineup when player statistics are unavailable, consistent with various embodiments.

Turning now to FIG. 10, FIG. 10 is a flow diagram of a process of calculating point values for a starting pitcher under circumstances where player statistics for the starting pitcher on a fantasy baseball team's starting lineup are not available from an actual baseball game, consistent with various embodiments.

In some embodiments, process 1000 may be executed in a system such as system 300 of FIG. 3. At block 1010, game scoring module 342 determines the fantasy rotation sequence and the corresponding, actual rotation sequences associate with the starting pitcher. For example, a user may assign a starting pitcher a fantasy rotation sequence number of two. A Major League Baseball team manager may assign that starting pitcher an actual rotation sequence number of four.

At block 1020, game scoring module 342 determines the fantasy game rotation sequence associated with the fantasy rotation sequence and the actual game rotation sequence associated with the actual rotation sequence. Continuing the preceding example, fantasy rotation sequence number two may correspond to a fantasy game on a Tuesday, which has a fantasy game rotation sequence number of two. Actual rotation sequence number four may correspond to an actual game on the following Thursday, which has an actual game rotation sequence number of four. At block 1030, game scoring module 342 leaves scoring for the fantasy game open until the starting pitcher's player statistics are available from the actual game associated with the actual game rotation sequence. Continuing the preceding example, once the starting pitcher has pitched in Thursday's actual game, his player statistics are allocated to the score of the previous Tuesday's fantasy game.

Figure 11:
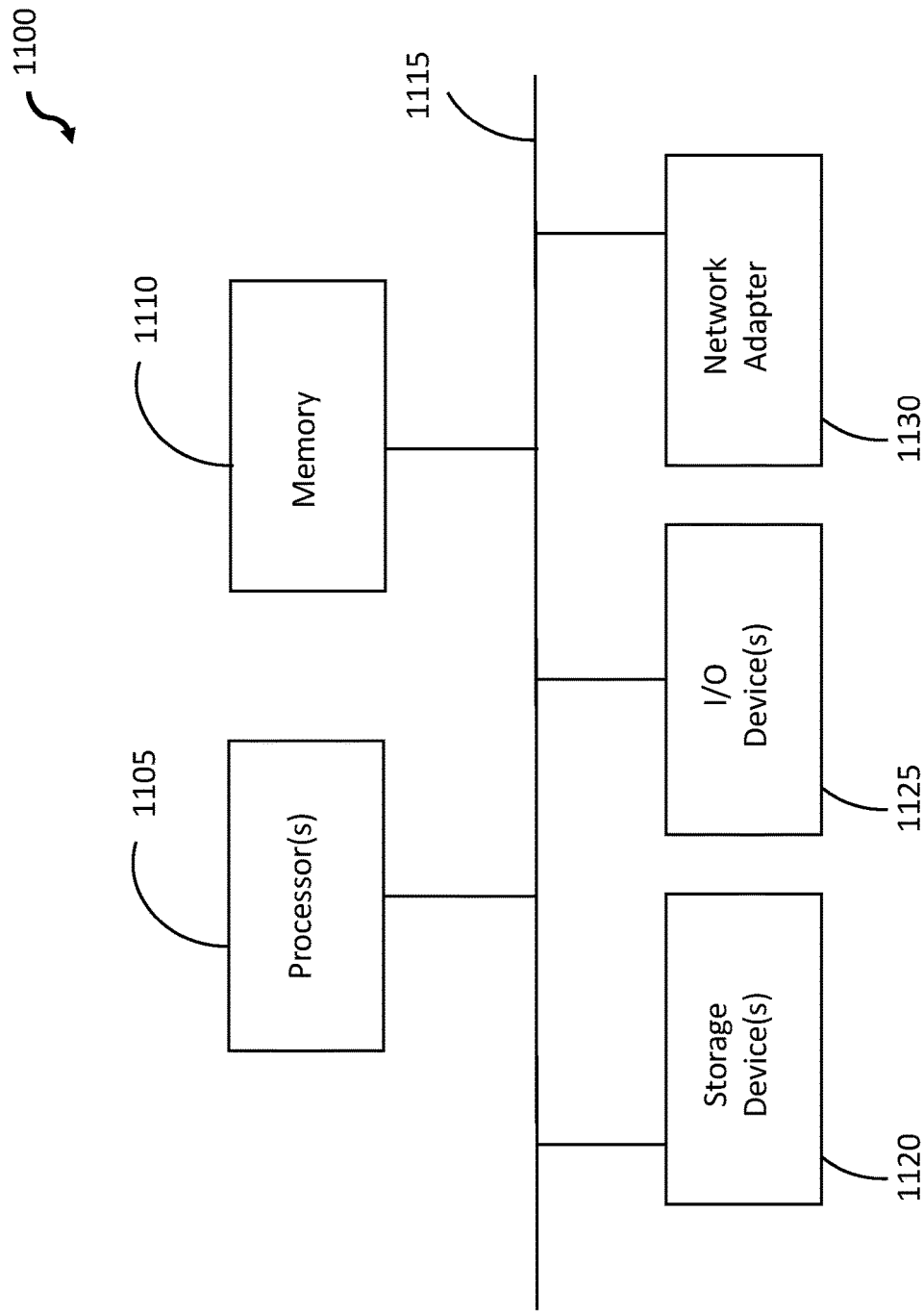
FIG. 11 is a block diagram illustrating components of an apparatus that may perform various operations described by the technology.

Turning now to FIG. 11, FIG. 11 is a block diagram illustrating components of an apparatus that may perform various operations described by the technology.

FIG. 11 is a block diagram of a computer system as may be used to implement features of some embodiments of the disclosed technology. Computing system 1100 may include one or more central processing units ("processors") 1105, memory 1110, input/output devices 1125 (e.g., key-board and pointing devices, and display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a Hyper Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1110 and storage devices 1120 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media may include computer-readable media (e.g., "non-transitory" media) and computer-readable transmission media. The instructions stored in memory 1110 may be implemented as software and/or firmware to program the processor(s) 1105 to carry out actions described above. In some embodiments, such software or firmware may be initially provided to the processing system 1100 by downloading it from a remote system through the computing system 1100 (e.g., via network adapter 1130).

The technology introduced herein may be implemented by, for example, programmable circuitry (e.g., one or more microprocessors) programmed with software and/or firmware, or entirely in special-purpose hardwired (non-program-mable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the invention. Accordingly, the invention is not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure in this specification are used to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing may be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, sub-steps may be performed in parallel, illustrated logic may be omitted, other logic may be included, etc.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Furthermore, in the specification, figures and claims, reference is made to particular features (including method steps) of the invention. It is to be understood that the disclosure of the invention includes all possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C may consist of (i.e., contain only) components A, B and C, or may contain not only components A, B, and C but also contain one or more other components.

Where reference is made herein to a method comprising two or more defined steps, the defined steps may be carried out in any order or simultaneously (except where the context excludes that possibility), and the method may include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," "program," "device," or "system." Furthermore, aspects of the disclosed invention may take the form of a computer program product embodied in one or more computer readable media having computer readable program code embodied thereon.

Any element in a claim that does not explicitly state "means for" performing a specified function, or "step for" performing a specific function is not to be interpreted as a "means" or "step" clause as specified in 35. U.S.C. § 112 ¶6. Specifically, the use of "step of" in the claims herein is not intended to invoke the provisions of U.S.C. § 112 ¶6.

I claim:

1. A fantasy sports method comprising:
    determining, by a scheduling service executing on a computer system, a plurality of actual game days during an actual regular season of a sport on which a fantasy sport is based, wherein the plurality of actual game days is based on a plurality of actual regular season games during the actual regular season;
    determining, by the scheduling service, one or more necessary game days, wherein the one or more necessary game days are based on the plurality of actual game days;
    determining, by the scheduling service, a plurality of fantasy game days, wherein the plurality of fantasy game days is based on the one or more necessary game days, and wherein two or more of the fantasy game days occur within the same calendar week for a plurality of weeks during the regular season;
    determining, by the scheduling service, a number and format of fantasy regular season games, wherein the number and format of fantasy regular season games are based on the plurality of fantasy game days and wherein the number and format of fantasy regular season games emulate or approximate a number and format of the plurality of actual regular season games;
    scheduling, by the scheduling service, a plurality of fantasy regular season games on the plurality of fantasy game days, wherein the plurality of fantasy regular season games is scheduled in the number and format of fantasy regular season games;
    determining, by the scheduling service, a plurality of available fantasy game days, wherein the plurality of available fantasy game days is based on the plurality of fantasy game days not used to schedule the plurality of fantasy regular season games;
    determining, by the scheduling service, a number and format of fantasy postseason games, wherein the number and format of fantasy postseason games are based on the plurality of available fantasy game days and a plurality of fantasy teams and wherein the number and format of fantasy postseason games emulate or approximate a number and format of a plurality of actual postseason games during an actual postseason of the sport on which the fantasy sport is based;
    scheduling, by the scheduling service, a plurality of fantasy postseason games on the plurality of available fantasy game days, wherein the plurality of fantasy postseason games is scheduled in the number and format of fantasy postseason games;
    getting, by a scoring service executing on a computer system, one or more player statistics for a player in a starting lineup of a fantasy game, wherein the one or more player statistics are from an actual game of a sport on which a fantasy sport is based;
    IF the one or more player statistics are not available THEN
        determining, by the scoring service, an action to be performed, wherein the action comprises at least one of:
            leaving a score for the fantasy game open until the one or more player statistics are available from a future actual game in the sport on which the fantasy sport is based;
            substituting the one or more player statistics with one or more corresponding player statistics for a spot starter, wherein the one or more corresponding player statistics are from the actual game of a sport on which a fantasy sport is based; and
            setting the one or more player statistics equal to a value of zero; and
        performing, by the scoring service, the action;
    ELSE
        returning to getting one or more player statistics are available; and
    wherein leaving the score for the fantasy game open, wherein the fantasy sport is baseball and the one or more player statistics are associated with a starting pitcher on the starting lineup, includes:
        determining, by the scoring service, a fantasy rotation sequence associated with the starting pitcher and an actual rotation sequence associated with the starting pitcher;
        determining, by the scoring service, a fantasy game rotation sequence associated with the fantasy rotation sequence and an actual game rotation sequence associated with the actual rotation sequence; and
        leaving the score for the fantasy game open until the one or more player statistics are available from an actual game associated with the actual game rotation sequence.

2. A fantasy sports system comprising:
    a processor;
    an actual game day logic configured to determining, by a scheduling service executing on a computer system, a plurality of actual game days during an actual regular season of a sport on which a fantasy sport is based, wherein the plurality of actual game days is based on a plurality of actual regular season games during the actual regular season;
    a necessary game day logic configured to determining, by the scheduling service, one or more necessary game days, wherein the one or more necessary game days are based on the plurality of actual game days;
    a fantasy game day logic configured to determining, by the scheduling service, a plurality of fantasy game days, wherein the plurality of fantasy game days is based on the one or more necessary game days, and wherein two or more of the fantasy game days occur within the same calendar week for a plurality of weeks during the regular season;
    a regular season game logic configured to determining, by the scheduling service, a number and format of fantasy regular season games, wherein the number and format of fantasy regular season games are based on the plurality of fantasy game days and wherein the number and format of fantasy regular season games emulate or approximate a number and format of the plurality of actual regular season games;

a regular season logic configured to scheduling, by the scheduling service, a plurality of fantasy regular season games on the plurality of fantasy game days, wherein the plurality of fantasy regular season games is scheduled in the number and format of fantasy regular season games;

an available game day logic configured to determining, by the scheduling service, a plurality of available fantasy game days, wherein the plurality of available fantasy game days is based on the plurality of fantasy game days not used to schedule the plurality of fantasy regular season games;

a postseason game logic configured to determining, by the scheduling service, a number and format of fantasy postseason games, wherein the number and format of fantasy postseason games are based on the plurality of available fantasy game days and a plurality of fantasy teams and wherein the number and format of fantasy postseason games emulate or approximate a number and format of a plurality of actual postseason games during an actual postseason of the sport on which the fantasy sport is based;

a postseason logic configured to scheduling, by the scheduling service, a plurality of fantasy postseason games on the plurality of available fantasy game days, wherein the plurality of fantasy postseason games is scheduled in the number and format of fantasy postseason games;

a player statistics logic configured to getting, by a scoring service executing on a computer system, one or more player statistics for a player in a starting lineup of a fantasy game, wherein the one or more player statistics are from an actual game of a sport on which a fantasy sport is based;

a statistics condition logic configured to performing:
IF the one or more player statistics are not available THEN
determining, by the scoring service, an action to be performed, wherein the action comprises at least one of:
leaving a score for the fantasy game open until the one or more player statistics are available from a future actual game in the sport on which the fantasy sport is based;
substituting the one or more player statistics with one or more corresponding player statistics for a spot starter, wherein the one or more corresponding player statistics are from the actual game of a sport on which a fantasy sport is based; and
setting the one or more player statistics equal to a value of zero; and
performing, by the scoring service, the action;
ELSE
returning to getting one or more player statistics are available; and wherein leaving the score for the fantasy game open, wherein the fantasy sport is baseball and the one or more player statistics are associated with a starting pitcher on the starting lineup, includes:
a rotation sequence logic configured to determining, by the scoring service, a fantasy rotation sequence associated with the starting pitcher and an actual rotation sequence associated with the starting pitcher;
a game rotation logic configured to determining, by the scoring service, a fantasy game rotation sequence associated with the fantasy rotation sequence and an actual game rotation sequence associated with the actual rotation sequence; and
leaving the score for the fantasy game open until the one or more player statistics are available from an actual game associated with the actual game rotation sequence.

3. A non-transitory, computer-readable medium storing program instructions that, when executed by a processor, cause the processor to perform the method of:
determining, by a scheduling service executing on a computer system, a plurality of actual game days during an actual regular season of a sport on which a fantasy sport is based, wherein the plurality of actual game days is based on a plurality of actual regular season games during the actual regular season;
determining, by the scheduling service, one or more necessary game days, wherein the one or more necessary game days are based on the plurality of actual game days;
determining, by the scheduling service, a plurality of fantasy game days, wherein the plurality of fantasy game days is based on the one or more necessary game days, and wherein two or more of the fantasy game days occur within the same calendar week for a plurality of weeks during the regular season;
determining, by the scheduling service, a number and format of fantasy regular season games, wherein the number and format of fantasy regular season games are based on the plurality of fantasy game days and wherein the number and format of fantasy regular season games emulate or approximate a number and format of the plurality of actual regular season games;
scheduling, by the scheduling service, a plurality of fantasy regular season games on the plurality of fantasy game days, wherein the plurality of fantasy regular season games is scheduled in the number and format of fantasy regular season games;
determining, by the scheduling service, a plurality of available fantasy game days, wherein the plurality of available fantasy game days is based on the plurality of fantasy game days not used to schedule the plurality of fantasy regular season games;
determining, by the scheduling service, a number and format of fantasy postseason games, wherein the number and format of fantasy postseason games are based on the plurality of available fantasy game days and a plurality of fantasy teams and wherein the number and format of fantasy postseason games emulate or approximate a number and format of a plurality of actual postseason games during an actual postseason of the sport on which the fantasy sport is based;

scheduling, by the scheduling service, a plurality of fantasy postseason games on the plurality of available fantasy game days, wherein the plurality of fantasy postseason games is scheduled in the number and format of fantasy postseason games;

getting, by a scoring service executing on a computer system, one or more player statistics for a player in a starting lineup of a fantasy game, wherein the one or more player statistics are from an actual game of a sport on which a fantasy sport is based;

IF the one or more player statistics are not available THEN
    determining, by the scoring service, an action to be performed, wherein the action comprises at least one of:
        leaving a score for the fantasy game open until the one or more player statistics are available from a future actual game in the sport on which the fantasy sport is based;
        substituting the one or more player statistics with one or more corresponding player statistics for a spot starter, wherein the one or more corresponding player statistics are from the actual game of a sport on which a fantasy sport is based; and
        setting the one or more player statistics equal to a value of zero; and
    performing, by the scoring service, the action;
ELSE
    returning to getting one or more player statistics are available; and
wherein leaving the score for the fantasy game open, wherein the fantasy sport is baseball and the one or more player statistics are associated with a starting pitcher on the starting lineup, includes:
    determining, by the scoring service, a fantasy rotation sequence associated with the starting pitcher and an actual rotation sequence associated with the starting pitcher;
    determining, by the scoring service, a fantasy game rotation sequence associated with the fantasy rotation sequence and an actual game rotation sequence associated with the actual rotation sequence; and
    leaving the score for the fantasy game open until the one or more player statistics are available from an actual game associated with the actual game rotation sequence.

* * * * *